United States Patent
I et al.

(10) Patent No.: US 8,901,222 B2
(45) Date of Patent: Dec. 2, 2014

(54) POLYPHENYLENE ETHER, RESIN COMPOSITION, AND MOLDED BODY OF RESIN COMPOSITION

(75) Inventors: Shunichiro I, Tokyo (JP); Yoshikuni Akiyama, Tokyo (JP); Hiroshi Kamo, Tokyo (JP); Yoshifumi Araki, Tokyo (JP); Toru Yamaguchi, Tokyo (JP); Tomohiro Kondo, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 13/878,515

(22) PCT Filed: Oct. 13, 2010

(86) PCT No.: PCT/JP2010/067957
§ 371 (c)(1),
(2), (4) Date: May 24, 2013

(87) PCT Pub. No.: WO2012/049743
PCT Pub. Date: Apr. 19, 2012

(65) Prior Publication Data
US 2013/0231430 A1    Sep. 5, 2013

(51) Int. Cl.
| C08K 5/13 | (2006.01) |
| C08L 53/02 | (2006.01) |
| C08L 23/12 | (2006.01) |
| C08L 77/02 | (2006.01) |
| C08L 77/06 | (2006.01) |

(52) U.S. Cl.
CPC ............ *C08L 53/02* (2013.01); *C08L 23/12* (2013.01); *C08L 77/02* (2013.01); *C08L 77/06* (2013.01); *C08L 53/025* (2013.01)
USPC ............................................................ 524/323

(58) Field of Classification Search
USPC .......................................................... 524/323
See application file for complete search history.

(56) References Cited

U.S. PATENT DOCUMENTS

| 3,281,383 A | 10/1966 | Zelinski et al. |
| 3,333,024 A | 7/1967 | Haefele et al. |
| 3,440,217 A | 4/1969 | Faurote et al. |
| 3,639,517 A | 2/1972 | Kitchen et al. |
| 4,167,507 A | 9/1979 | Haaf |
| 4,192,828 A | 3/1980 | Witschard |
| 4,501,857 A | 2/1985 | Kishimoto et al. |
| 4,603,194 A | 7/1986 | Mendiratta et al. |
| 4,772,657 A | 9/1988 | Akiyama et al. |
| 4,895,929 A | 1/1990 | Abe et al. |
| 4,987,194 A | 1/1991 | Maeda et al. |
| 5,081,185 A | 1/1992 | Haaf et al. |
| 5,089,562 A | 2/1992 | van de Meer et al. |
| 5,262,480 A | 11/1993 | Lee, Jr. |
| 6,045,883 A | 4/2000 | Akiyama et al. |
| 6,258,879 B1 | 7/2001 | Adedeji et al. |
| 6,576,700 B2 | 6/2003 | Patel |
| 2003/0023006 A1 | 1/2003 | Patel |
| 2003/0130438 A1 | 7/2003 | Amagai et al. |
| 2003/0176543 A1 | 9/2003 | Patel |
| 2004/0214952 A1 | 10/2004 | Kannan |
| 2005/0131108 A1 | 6/2005 | Yamamoto et al. |
| 2005/0228077 A1 | 10/2005 | Alger et al. |
| 2007/0073738 A1 | 3/2007 | Fredrickson et al. |
| 2007/0106000 A1 | 5/2007 | Guo et al. |

FOREIGN PATENT DOCUMENTS

| CN | 1806008 A | 7/2006 |
| CN | 1806010 A | 7/2006 |
| CN | 101759992 A | 6/2010 |
| CN | 101787199 A | 7/2010 |
| EP | 0 401 690 A2 | 12/1990 |
| GB | 1020720 A | 2/1966 |
| GB | 1130770 A | 10/1968 |
| JP | 47-11486 A | 6/1972 |
| JP | 49-66743 A | 6/1974 |
| JP | 50-6520 A | 1/1975 |
| JP | 50-71742 A | 6/1975 |
| JP | 50-75651 A | 6/1975 |
| JP | 51-27256 A | 3/1976 |
| JP | 54-126255 A | 10/1979 |
| JP | 56-10542 A | 2/1981 |
| JP | 56-62847 A | 5/1981 |
| JP | 56-100840 A | 8/1981 |
| JP | 62-20551 A | 1/1987 |
| JP | 2-113059 A | 4/1990 |
| JP | 2-113060 A | 4/1990 |
| JP | H07-107126 B | 5/1990 |

(Continued)

OTHER PUBLICATIONS

Search report from International Patent Appl. No. PCT/JP2010/067957, mail date is Jan. 11, 2011.

(Continued)

*Primary Examiner* — Peter Szekely

(74) *Attorney, Agent, or Firm* — Greenblum & Bernstein, P.L.C.

(57) ABSTRACT

The polyphenylene ether according to the present invention includes 5 to 20% by mass of a component having a molecular weight of 50,000 or more and 12 to 30% by mass of a component having a molecular weight of 8,000 or less. The resin composition according to the present invention includes the polyphenylene ether (a) and a hydrogenated block copolymer (b) prepared by hydrogenating a block copolymer including at least two polymer blocks A having a vinyl aromatic compound and at least one polymer block B having a conjugated diene compound, wherein the number average molecular weight (Mnb) of the hydrogenated block copolymer is 100,000 or less, and the number average molecular weight (MnbA) of at least one polymer block of the polymer blocks A is 8,000 or more.

4 Claims, No Drawings

(56) References Cited

FOREIGN PATENT DOCUMENTS

| | | |
|---|---|---|
| JP | 2-300218 A | 12/1990 |
| JP | 4-500094 A | 1/1992 |
| JP | 6-57130 A | 3/1994 |
| JP | 6-192561 A | 7/1994 |
| JP | 9-12799 A | 1/1997 |
| JP | 9-12804 A | 1/1997 |
| JP | 9-87450 A | 3/1997 |
| JP | 11-12354 A | 1/1999 |
| JP | 2000-281779 A | 10/2000 |
| JP | 2000-281798 A | 10/2000 |
| JP | 2000-281799 A | 10/2000 |
| JP | 2002-541290 A | 12/2002 |
| JP | 2003-531234 A | 10/2003 |
| JP | 2004-99824 A | 4/2004 |
| JP | 2004-136643 A | 5/2004 |
| JP | 2004-269665 A | 9/2004 |
| JP | 2007-238865 A | 9/2007 |
| JP | 2007-530774 A | 11/2007 |
| JP | 2008-524379 A | 7/2008 |
| JP | 2008-524381 A | 7/2008 |
| JP | 2008-297476 A | 12/2008 |
| JP | 2009-275208 A | 11/2009 |
| JP | 2010-138216 A | 6/2010 |
| JP | 2010-189548 A | 9/2010 |
| JP | 2010-215783 A | 9/2010 |
| JP | 2010-241876 A | 10/2010 |
| JP | 2010-254994 A | 11/2010 |
| WO | 97/01600 A1 | 1/1997 |
| WO | 02/12370 A1 | 2/2002 |
| WO | 2005/097897 A1 | 10/2005 |
| WO | 2006/083365 A1 | 8/2006 |

OTHER PUBLICATIONS

U.S. Office Action issued with respect to U.S. Appl. No. 13/878,484, mail date is Nov. 22, 2013.

POLYPHENYLENE ETHER, RESIN COMPOSITION, AND MOLDED BODY OF RESIN COMPOSITION

TECHNICAL FIELD

The present invention relates to a polyphenylene ether having a specific molecular weight, a resin composition containing polyphenylene ether having a specific molecular weight, and a molded body of the resin composition.

BACKGROUND ART

Polyphenylene ether is known as an engineering plastic having high flame retardancy, heat resistance, dimensional stability, non-moisture-absorbing properties and electrical properties, but has demerits such as poor melting fluidity and inferior moldability and impact resistance. For this reason, often, polyphenylene ether is mixed with other polymer and used to take advantages of polyphenylene ether and compensate for its demerits. Examples of the other polymer include block copolymers of a hydrogenated styrene and a conjugated diene (hereinafter, also referred to as a "hydrogenated block copolymer") and various polymers such as polypropylene-based resins.

The hydrogenated block copolymers have high thermal stability and weatherability while these copolymers have demerits. For example, rubber elasticity at a high temperature is insufficient, leading to large deformation due to heat and pressure, and large compression set at a high temperature.

Moreover, the polypropylene-based resin is an inexpensive plastic having low specific gravity, and has high resistance against chemicals, solvent resistance, moldability, and the like. For this reason, the polypropylene resin is used in various fields of automobile parts, electrical and electronic parts, household electrical appliance parts, and the like.

In order to provide merits of these polyphenylene ether, hydrogenated block copolymers, and polypropylene resins and compensate for their demerits, a variety of resin compositions prepared by using these components in combination properly and mixing the components have been proposed.

For example, Patent Literatures 1 to 4 propose polyphenylene ether resin/hydrogenated block copolymer compositions, and Patent Literatures 5 to 14 propose polyphenylene ether/polypropylene-based resin compositions. In the case where high fluidity is required in the resin composition as above in which the polyphenylene ether resin and the polypropylene resin are blended, it apparently can be expected that the processability of the resin composition to be obtained is improved by reducing the molecular weight of polyphenylene ether as a factor to determine the fluidity of polyphenylene ether.

Moreover, production methods enabling processing using general-purpose process machines and conditions in the case where the resin composition containing polyphenylene ether is obtained have been proposed. For example, Patent Literatures 15 and 16 describe resin compositions containing polyphenylene ether and polystyrene and the production methods thereof.

PRIOR ART LIST

Patent Literature

Patent Literature 1: Japanese Patent Publication No. 51-27256
Patent Literature 2: Japanese Patent Laid-Open No. 50-71742
Patent Literature 3: Japanese Patent Laid-Open No. 62-20551
Patent Literature 4: Japanese Patent Publication No. 7-107126
Patent Literature 5: Japanese Patent Laid-Open No. 02
Patent Literature 6: U.S. Pat. No. 5,262,480
Patent Literature 7: Japanese Patent Laid-Open No. 06-57130
Patent Literature 8: Japanese Patent Laid-Open No. 06-192561
Patent Literature 9: WO97/01600
Patent Literature 10: Japanese Patent Laid-Open No. 09-12799
Patent Literature 11: Japanese Patent Laid-Open No. 09-12804
Patent Literature 12: Japanese Patent Laid-Open No. 09-87450
Patent Literature 13: National Publication of International Patent Application No. 2008-524379
Patent Literature 14: National Publication of International Patent Application No. 2008-524381
Patent Literature 15: National Publication of International Patent Application No. 2007-530774
Patent Literature 16: National Publication of International Patent Application No. 2002-541290

SUMMARY OF INVENTION

Problems to be Solved by Invention

Patent Literatures 1 to 14 above disclose compositions comprising a low molecular weight polyphenylene ether and a hydrogenated block copolymer, polypropylene, and the like. In these compositions, use of a low molecular weight polyphenylene ether improves poor melting fluidity while the properties of polyphenylene ether itself are not described. Moreover, no description is found about the optimal design of polyphenylene ether in mixing with the hydrogenated block copolymer or polypropylene.

Moreover, usually, an oligomer component is increased in the low molecular weight polyphenylene ether because of its low molecular weight. For this reason, the low molecular weight polyphenylene ether has a problem such as bad color tone attributed to discoloring of the oligomer component during heating.

Patent Literatures 1 to 4 above disclose resin compositions comprising a polyphenylene ether and a hydrogenated block copolymer in which the polyphenylene ether has a molecular weight in a wide range of a low molecular weight to a high molecular weight. However, the resin composition to be obtained has insufficient fluidity and tensile elongation, and therefore is not suitable for the application in which these properties are demanded. This is attributed to inappropriate selection of the molecular weight of the polyphenylene ether to be used and the structure and molecular weight of the hydrogenated block copolymer to be used.

Patent Literatures 5 to 14 disclose resin compositions comprising a polyphenylene ether and a polyolefin. However, it cannot be said that the resin composition to be obtained has sufficient processability, heat resistance, mechanical properties, and morphology stability. Namely, the factor of insufficient processability, heat resistance, and mechanical properties of a polymer alloy in which an incompatible polyphenylene ether is emulsified and dispersed in a polypropylene is attributed to inappropriate selection of the respective materials for the polymer alloy. Usually, it is known that to emulsify and disperse polyphenylene ether in polypropylene, a hydrogenated block copolymer is essential as an emulsifying dispersant (compatibilizer). The performance of the polymer alloy demonstrating the emulsifying and dispersion structure is governed by an emulsifying and dispersion technique in which the structure of the polyphenylene ether emulsified in the polypropylene to form a dispersed phase and the structure of the hydrogenated block copolymer as the emulsifying dispersant (compatibilizer) compensate for each other. However, at present, no technical suggestion or disclosure is found to clarify the interrelationship between the structure of the polyphenylene ether and the structure of the hydrogenated block copolymer as the factors to control emulsifying and dispersion.

Patent Literatures 15 and 16 describe pellets containing polyphenylene ether while no description or suggestion is found about the optimal design of the polyphenylene ether and the hydrogenated block copolymer from the viewpoint of the lightfastness of the resin composition to be obtained, peel off of layers, and suppression in die drool during processing.

In consideration of the problems in the related art as described above, an object of the present invention is to provide a polyphenylene ether having a good color tone and high fluidity, a resin composition comprising a polyphenylene ether and a hydrogenated block copolymer and having high fluidity, mechanical properties, heat resistance, and the like, and a resin composition comprising a polyphenylene ether and a polypropylene having high heat resistance, mechanical properties, and the like.

Means for Solving Problems

The present inventors found out that in consideration of such circumstances, if a polyphenylene ether is configured to have a specific molecular weight, a polyphenylene ether having a good color tone and high fluidity is obtained. Also, a hydrogenated block copolymer having the optimal polymer structure is found out from the viewpoint of the compatibility with the specific polyphenylene ether, and it was found out that a resin composition comprising the specific polyphenylene ether and the specific hydrogenated block copolymer has high mechanical properties, fluidity, and transparency. Further, it was found out that a resin composition comprising polypropylene has high processability, heat resistance, and mechanical properties, and further, that a polyphenylene ether that forms a dispersed phase as an incompatible polymer alloy demonstrates a thermally stable dispersion state.

Namely, the present invention is as follows.

[1]

A polyphenylene ether comprising:

5 to 20% by mass of a component having a molecular weight of 50,000 or more; and 12 to 30% by mass of a component having a molecular weight of 8,000 or less.

[2]

The polyphenylene ether according to [1], wherein an amount of a remaining metal catalyst is 1.0 ppm or less.

[3]

A resin composition comprising:

the polyphenylene ether (a) according to [1]; and a hydrogenated block copolymer (b) prepared by hydrogenating a block copolymer comprising at least two polymer blocks A mainly containing a vinyl aromatic compound and at least one polymer block B mainly containing a conjugated diene compound, wherein the number average molecular weight (Mnb) of the hydrogenated block copolymer is 100,000 or less, and the number average molecular weight (MnbA) of at least one polymer block of the polymer blocks A is 8,000 or more, wherein an amount of the polyphenylene ether (a) is 1 to 99% by mass, and an amount of the hydrogenated block copolymer (b) is 99 to 1% by mass where a total amount of the polyphenylene ether (a) and the hydrogenated block copolymer (b) is 100% by mass.

[4]

The resin composition according to [3], further comprising a polystyrene-based resin, wherein the amount of the polyphenylene ether (a) is 50% by mass or more and an amount of the polystyrene-based resin is less than 50% by mass where a total amount of the polyphenylene ether (a) and the polystyrene resin is 100% by mass, and a content of the polymer blocks A in the hydrogenated block copolymer (b) is 15 to 50% by mass based on the entire hydrogenated block copolymer (b); in a bonding form of the conjugated diene compound in the polymer block B in the hydrogenated block copolymer (b), a total amount of the conjugated diene compound bonded with a 1,2-vinyl bond or a 3,4-vinyl bond is 70 to 90% by mass based on all the conjugated diene compounds that form the polymer block B.

[5]

A method of using a resin composition in which heat resistance of polypropylene is improved by adding a resin composition according to [3] or [4] to the polypropylene.

[6]

A resin composition comprising:

a polyphenylene ether (a) according to [1];

a hydrogenated block copolymer (b) prepared by hydrogenating a block copolymer comprising at least two polymer blocks A mainly containing a vinyl aromatic compound and at least one polymer block B mainly containing a conjugated diene compound, wherein a number average molecular weight (Mnb) of the hydrogenated block copolymer is 100,000 or less, and a number average molecular weight (MnbA) of at least one polymer block of the polymer blocks A is 8,000 or more; and a polypropylene (c), wherein the amount of the polyphenylene ether (a) is 1 to 99% by mass and the amount of the hydrogenated block copolymer (b) is 99 to 1% by mass where the total amount of the polyphenylene ether (a) and the hydrogenated block copolymer (b) is 100% by mass, and an amount of the polypropylene (c) is 1 to 95% by mass where the total amount of the components (a) to (c) is 100% by mass.

[7]

The resin composition according to [6], wherein in the bonding form of the conjugated diene compound in the polymer block B in the hydrogenated block copolymer (b), the total amount of the conjugated diene compound bonded with a 1,2-vinyl bond or a 3,4-vinyl bond is 70 to 90% by mass based on all the conjugated diene compounds that form the polymer block B.

[8]

The resin composition according to [6], wherein the polypropylene (c) is a mixture of at least two polypropylenes having different molecular weights, and comprises a homopolypropylene and/or a block polypropylene, and a melt flow rate (MFR: measured according to ASTM D1238 at 230° C. and a load of 2.16 kg) of the homopolypropylene and/or the block polypropylene is 0.1 to 100 g/10 min.

[9]

The resin composition according to [6], wherein the content of the polymer blocks A in the hydrogenated block copolymer (b) is 15 to 50% by mass based on the entire hydrogenated block copolymer (b).

[10]
The resin composition according to [6], further comprising an organic stabilizer,
wherein a content of the organic stabilizer is 0.1 to 2.0% by mass where the total amount of the resin composition is 100% by mass,
the organic stabilizer contains at least a hindered phenol-based stabilizer, and
a content of the hindered phenol-based stabilizer in the organic stabilizer is 40 to 100% by mass where a total amount of the organic stabilizer is 100% by mass.
[11]
The resin composition according to [6], further comprising a filler (f),
wherein a content of the filler (f) is 2 to 60% by mass based on the total amount of the resin composition.
[12]
A pellet formed of a resin composition according to any one of [3], [4], and [6] to [11].
[13]
A method of producing a thermoplastic resin composition, comprising the step of melt kneading:
a pellet according to [12], and
one or more thermoplastic resins selected from the group consisting of vinyl aromatic compound polymers, vinyl aromatic compound copolymers, polypropylene-based resins, polyethylenes, ethylene-α-olefin copolymers, polyamide 6, polyamide 66, polyamide 66/6, polycarbonates, polyacetals, polyethylene terephthalate, polybutylene terephthalate, polytrimethylene terephthalate, aromatic ring-containing polyamides, aliphatic ring-containing polyamides, polyphenylene sulfide, liquid crystal polymers, polyether ether ketones, polyarylates, polyethersulfones, and polysulfones.
[14]
The method of producing the thermoplastic resin composition according to [13], wherein the step of melt kneading is performed using an extruder or an injection molding machine.
[15]
A molded body obtained by molding a resin composition according to any one of [3], [4], and [6] to [11].
[16]
The molded body according to [15], wherein the molded body is at least one selected from the group consisting of (1) to (4) below:
(1) sheets, films, or stretched sheets and films,
(2) automobile exterior and outer plate parts, automobile interior parts, or automobile underhood parts,
(3) electric wires and cables obtained by coating a metal conductor or an optical fiber with the resin composition, and
(4) ink-related parts and members in inkjet printers, or chassis thereof.

Advantageous Effects of Invention

The present invention can provide a polyphenylene ether having high fluidity and a good color tone, a polyphenylene ether-containing resin composition having high fluidity, heat resistance, mechanical properties, and transparency, and molded articles using the resin composition.

DESCRIPTION OF EMBODIMENTS

Hereinafter, an embodiment for implementing the present invention (hereinafter, referred to as "the present embodiment") will be described in detail. The present embodiment below is only an example for describing the present invention, and it should not be construed to limit the present invention to the present embodiment. The present invention can be properly modified within the scope of the gist thereof and implemented.

[Component (a)]

A polyphenylene ether (hereinafter, simply referred to as "PPE" in some cases) (a) according to the present embodiment is a homopolymer and/or a copolymer composed of a repeating unit structure represented by the following formula (1):

[Formula 1]

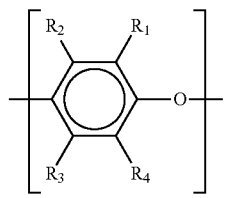

(1)

wherein $R_1$, $R_2$, $R_3$, and $R_4$ each independently are selected from the group consisting of a hydrogen atom, halogen atoms, an alkyl group having 1 to 7 carbon atoms, a phenyl group, a haloalkyl group, an aminoalkyl group, and a hydrocarbonoxy group, or a halohydrocarbonoxy group in which a halogen atom is separated from an oxygen atom by at least two carbon atoms.

In the above formula (1), examples of the halogen atoms represented by $R_1$, $R_2$, $R_3$, and $R_4$ include a fluorine atom, a chlorine atom, and a bromine atom. The chlorine atom and the bromine atom are preferable.

In the above formula (1), the "alkyl group" represented by $R_1$, $R_2$, $R_3$, and $R_4$ represents a linear or branched alkyl group having preferably 1 to 6, and more preferably 1 to 3 carbon atoms. Examples of the alkyl group include methyl, ethyl, propyl, isopropyl, butyl, isobutyl, sec-butyl, tert-butyl, pentyl, and hexyl. Methyl and ethyl are preferable, and methyl is more preferable.

In the above formula (1), the alkyl group represented by $R_1$, $R_2$, $R_3$, and $R_4$ may have one or two or more substituents in a position allowing substitution.

Examples of such substituents include halogen atoms (such as a fluorine atom, a chlorine atom, and a bromine atom), an alkyl group having 1 to 6 carbon atoms (such as methyl, ethyl, propyl, isopropyl, butyl, isobutyl, sec-butyl, tert-butyl, pentyl, and hexyl), an aryl group (such as phenyl and naphthyl), an alkenyl group (such as ethenyl, 1-propenyl, and 2-propenyl), an alkynyl group (such as ethynyl, 1-propynyl, and 2-propynyl), an aralkyl group (such as benzyl and phenethyl), and an alkoxy group (such as methoxy and ethoxy).

The polyphenylene ether according to the present embodiment is a low molecular weight polyphenylene ether having a small amount of an oligomer. The polyphenylene ether according to the present embodiment has a specific amount of a component having a molecular weight of 8,000 or less and a specific amount of a component having a molecular weight of 50,000 or more. Thereby, the polyphenylene ether according to the present embodiment has a good color tone and sufficiently high fluidity during melt processing, and can keep high mechanical and physical properties. Specifically, from the viewpoint of the fluidity, the component having a molecular weight of 50,000 or more is 5 to 20% by mass, and preferably 5 to 18% by mass based on the entire polyphenylene ether. From the viewpoint of the mechanical properties, the component having a molecular weight of 8,000 or less is 12 to 30% by mass, and more preferably 15 to 30% by mass based on the entire polyphenylene ether.

In the method of producing polyphenylene ether according to the present embodiment, for example, by controlling the polymerization time, the amount of a catalyst, the amount of a monomer, the composition of a solvent, and the like to be used, the component having a molecular weight of 50,000 or more can be controlled to have the specific amount above, and the component having a molecular weight of 8,000 or less can be controlled to have the specific amount above.

After the polyphenylene ether has been produced and, for example, when the amount of polyphenylene ether having a molecular weight of 8,000 or less is more than 30% by mass or less than 12% by mass or the polyphenylene ether having a molecular weight of 50,000 or more is more than 20% by mass or less than 5% by mass, the molecular weight can be adjusted by the following method.

For example, a method of dissolving the polyphenylene ether in a good solvent, reprecipitating the polyphenylene ether with a poor solvent and isolating the polyphenylene ether, a method of washing the polyphenylene ether with a mixed solvent of a good solvent and a poor solvent, and the like can be used.

These methods can control the molecular weight according to the treatment temperature, and thus can be used as a method for controlling the molecular weight of the polyphenylene ether. Meanwhile, it is highly possible that an unnecessary component whose molecular weight is reduced is loss of the polymer and the yield is reduced. For this reason, instead of use of the method for controlling the molecular weight of the polyphenylene ether, a method of producing the polyphenylene ether according to the present embodiment in a polymerization stage is preferable from the viewpoint of efficiently producing the polyphenylene ether.

In polyphenylene ethers usually used in the related art, a polyphenylene ether of a standard molecular weight type contains around 40% by mass of the component having a molecular weight of 50,000 or more, and even a polyphenylene ether called a low molecular weight type contains around 25% by mass of the component having a molecular weight of 50,000 or more. The polyphenylene ether according to the present embodiment is a low molecular weight type polyphenylene ether that contains an amount of the component having a molecular weight of 50,000 or more significantly smaller than the amounts above.

The information on the molecular weight of the polyphenylene ether according to the present embodiment is obtained by measurement using a gel permeation chromatograph. The specific measurement conditions of the gel permeation chromatography are as follows: using a gel permeation chromatography System 21 made by Showa Denko K.K. (column: two columns K-805L made by Showa Denko K.K. connected in series, column temperature: 40° C., solvent: chloroform, flow rate of the solvent: 1.0 ml/min, sample concentration: 1 g/L chloroform solution of polyphenylene ether), a calibration curve of standard polystyrenes (molecular weights of the standard polystyrenes are 3,650,000, 2,170,000, 1,090,000, 681,000, 204,000, 52,000, 30,200, 13,800, 3,360, 1,300, and 550) is created. The wavelength of the UV in a detecting unit can be selected for the standard polystyrene and the polyphenylene ether, respectively; 254 nm is selected for the standard polystyrene and 283 nm for the polyphenylene ether.

The number average molecular weight of the polyphenylene ether (Mna) is preferably not less than 7,000 and not more than 15,000. The lower limit of the number average molecular weight is more preferably 8,000 or more, and still more preferably 9,000 or more. The upper limit of the number average molecular weight is more preferably 14,000 or less, and still more preferably 13,000 or less. From the viewpoint of suppressing deformation of the resin composition during heating the resin composition, the lower limit of the number average molecular weight of the polyphenylene ether is preferably 7,000 or more. From the viewpoint of obtaining high fluidity during molding processing, the upper limit of the number average molecular weight of the polyphenylene ether is preferably 15,000 or less.

The polyphenylene ether represented by the above formula (1) can be produced by polymerizing phenol compounds below.

Examples of the phenol compounds include o-cresol, 2,6-dimethylphenol, 2-ethylphenol, 2-methyl-6-ethylphenol, 2,6-diethylphenol, 2-n-propylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2-phenylphenol, 2,6-diphenylphenol, 2,6-bis-(4-fluorophenyl)phenol, 2-methyl-6-tolylphenol, 2,6-ditolylphenol, 2, 5-dimethylphenol, 2,3,6-trimethylphenol, 2,5-diethylphenol, 2-methyl-5-ethylphenol, 2-ethyl-5-methylphenol, 2-allyl-5-methylphenol, 2,5-diallylphenol, 2,3-diethyl-6-n-propylphenol, 2-methyl-5-chlorophenol, 2-methyl-5-bromophenol, 2-methyl-5-isopropylphenol, 2-methyl-5-n-propylphenol, 2-ethyl-5-bromophenol, 2-methyl-5-n-butylphenol, 2,5-di-n-propylphenol, 2-ethyl-5-chlorophenol, 2-methyl-5-phenylphenol, 2,5-diphenylphenol, 2,5-bis-(4-fluorophenyl)phenol, 2-methyl-5-tolylphenol, 2,5-ditolylphenol, 2,6-dimethyl-3-allylphenol, 2,3,6-triallylphenol, 2,3,6-tributylphenol, 2,6-di-n-butyl-3-methylphenol, 2,6-di-t-butyl-3-methylphenol, 2,6-dimethyl-3-n-butylphenol, 2,6-dimethyl-3-t-butylphenol.

Particularly, 2,6-dimethylphenol, 2,6-diethylphenol, 2,6-diphenylphenol, 2,3,6-trimethylphenol, and 2,5-dimethylphenol are preferable, and 2,6-dimethylphenol and 2,3,6-trimethylphenol are more preferable because these are inexpensive and easily available.

These phenol compounds may be used singly or in combinations of two or more.

Examples of a method using the phenol compounds in combination include a method using 2,6-dimethylphenol in combination with 2,6-diethylphenol, a method using 2,6-dimethylphenol in combination with 2,6-diphenylphenol, a method using 2,3,6-trimethylphenol in combination with 2,5-dimethylphenol, and a method using 2,6-dimethylphenol in combination with 2,3,6-trimethylphenol. The mixing ratio can be arbitrarily selected. The phenol compound to be used may contain a small amount of m-cresol, p-cresol, 2,4-dimethylphenol, 2,4,6-trimethylphenol, or the like which are contained as a byproduct of the production.

The polyphenylene ether can be produced by two production methods, that is, precipitation deposition polymerization or solution polymerization. The precipitation deposition polymerization is a form of polymerization in which a polyphenylene ether having a predetermined molecular weight is precipitated and deposited. In the precipitation deposition polymerization, as the polymerization of the polyphenylene ether progresses, a polymerized product that reaches a molecular weight determined according to the solvent composition and the like is precipitated and deposited, and that having a molecular weight not more than the molecular weight determined according to the solvent composition and the like is dissolved. As the solvent, a mixed solvent of a good solvent for the polyphenylene ether such as toluene, xylene, and ethylbenzene and a poor solvent such as methanol and butanol is used. The deposited polyphenylene ether has a slow polymerization reaction rate. Accordingly, logically, the molecular weight distribution of the polyphenylene ether to be obtained is narrower.

Further, because the polyphenylene ether is deposited during the polymerization, the viscosity in the system is gradually reduced. Thereby, the concentration of the monomer during the polymerization (concentration of the phenol compound) can be increased. Additionally, the deposited polyphenylene ether can be easily extracted by filtration. Accordingly, the polyphenylene ether can be obtained by an extremely easy step.

Meanwhile, the solution polymerization is a polymerization method in which polymerization is performed in a good solvent for the polyphenylene ether, and no precipitate is deposited during the polymerization. All the polyphenylene ether molecules are dissolved, and the molecular weight distribution tends to be wider. In the solution polymerization, a polymerization solution having polyphenylene ether dissolved is developed in a poor solvent for the polyphenylene ether such as methanol to obtain powdery polyphenylene ether.

In the polymerization step of the polyphenylene ether according to the present embodiment, in both of the precipitation deposition polymerization and the solution polymerization, polymerization is performed while an oxygen containing gas is fed.

As the oxygen containing gas, pure oxygen, a mixed gas of oxygen and an inert gas such as nitrogen in any proportion, air, a mixed gas of air and an inert gas such as nitrogen and a noble gas in any proportion, and the like can be used.

The pressure within the system during the polymerization reaction may be normal pressure. When necessary, reduced pressure or applied pressure can be used.

The feeding rate of the oxygen containing gas can be arbitrarily selected considering removal of heat or the polymerization rate and the like. As pure oxygen per 1 mol of the phenol compound used for the polymerization, the feeding rate is preferably 5 NmL/min or more, and more preferably 10 NmL/min or more.

Hydroxides of alkali metals, hydroxides of alkaline earth metals, alkoxides of alkali metals, neutral salts such as magnesium sulfate and calcium chloride, zeolite, or the like may be added to the polymerization reaction system of the polyphenylene ether.

Moreover, a surfactant conventionally known as a surfactant having an effect of improving the polymerization activity may be added to the polymerization solvent. Examples of such a surfactant include trioctylmethylammonium chloride known as Aliquat 336 or CapRiquat (made by DOJINDO LABORATORIES, trade names). The amount of the surfactant to be used is preferably within the range of not more than 0.1% by mass based on the total amount of the polymerization reaction raw materials.

As a catalyst used in the production of the polyphenylene ether according to the present embodiment, known catalyst systems usually used in production of polyphenylene ethers can be used.

Examples of the catalysts include those comprising a transition metal ion having an oxidation reduction ability and an amine compound coordinatable with the metal ion. Specifically, examples thereof include catalyst system comprising a copper compound and amine, catalyst system comprising a manganese compound and amine, and catalyst system comprising a cobalt compound and amine.

The polymerization reaction progresses efficiently under a slightly alkaline condition. Accordingly, some alkali or additional amine may be added to the polymerization reaction system.

Examples of suitable catalysts in the production step of the polyphenylene ether according to the present embodiment include catalysts containing a copper compound, a halogen compound, and a diamine compound represented by the following formula (2) as the constitutional components.

[Formula 2]

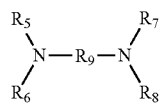

(2)

In the above formula (2), $R_5$, $R_6$, $R_7$, and $R_8$ each independently are selected from the group consisting of a hydrogen atom and a linear or branched alkyl group having 1 to 6 carbon atoms. Not all of $R_5$, $R_6$, $R_7$, and $R_8$ are hydrogen at the same time. $R_9$ represents a linear or branched alkylene group having 2 to 5 carbon atoms.

As the copper compound that forms the catalyst component, cuprous compounds, cupric compounds, or a mixture thereof can be used. Examples of the cuprous compounds include cuprous chloride, cuprous bromide, cuprous sulfate, and cuprous nitrate. Examples of the cupric compounds include cupric chloride, cupric bromide, cupric sulfate, and cupric nitrate. Among these, particularly preferable copper compounds are cuprous chloride, cupric chloride, cuprous bromide, and cupric bromide.

These copper compounds may be synthesized from an oxide (such as cuprous oxide), a carbonate, a hydroxide, or the like of copper and the corresponding halogen or acid.

For example, the copper compound can be synthesized by mixing cuprous oxide with a halogen compound (for example, a halogenated hydrogen solution).

These copper compounds may be used singly or in combinations of two or more.

Examples of the halogen compound that forms the catalyst component include hydrogen chloride, hydrogen bromide, hydrogen iodide, sodium chloride, sodium bromide, sodium iodide, potassium chloride, potassium bromide, potassium iodide, tetramethylammonium chloride, tetramethylammonium bromide, tetramethylammonium iodide, tetraethylammonium chloride, tetraethylammonium bromide, and tetraethylammonium iodide. These halogen compounds can be used as an aqueous solution thereof or a solution using a proper solvent.

These halogen compounds may be used singly or in combinations of two or more.

A preferable halogen compound is an aqueous solution of hydrogen chloride and an aqueous solution of hydrogen bromide.

The amount of these compounds to be used is not particularly limited. The amount of the halogen atom is preferably not less than 2 times and not more than 20 times the molar amount of a copper atom. The amount of the copper atom to be used is preferably within the range of 0.02 mol to 0.6 mol based on the 100 mol of the phenol compound to be used.

Examples of the diamine compound represented by the above formula (2) include N,N,N',N'-tetramethylethylenediamine, N,N,N'-trimethylethylenediamine, N,N'-dimethylethylenediamine, N,N-dimethylethylenediamine, N-methylethylenediamine, N,N,N',N'-tetraethylethylenediamine, N,N,N'-triethylethylenediamine, N,N'-diethylethylenediamine, N,N-diethylethylenediamine, N-ethylethylenediamine, N,N-dimethyl-N'-ethylethylenediamine, N,N'-dimethyl-N-ethylethylenediamine, N-n-propylethylenediamine, N,N'-di-n-propylethylenediamine, N-i-propylethylenediamine, N,N'-di-i-propylethylenediamine, N-n-butylethylenediamine, N,N'-di-n-butylethylenediamine, N-i-butylethylenediamine, N,N'-di-i-butylethylenediamine, N-t-butylethylenediamine, N,N'-di-t-butylethylenediamine, N,N,N',N'-tetramethyl-1,3-diaminopropane, N,N,N'-trimethyl-1,3-diaminopropane, N,N'-dimethyl-1,3-diaminopropane, N-methyl-1,3-diaminopropane, N,N,N',N'-tetramethyl-1,3-diamino-1-methylpropane, N,N,N',N'-tetramethyl-1,3-diamino-2-methylpropane, N,N,N',N'-tetramethyl-1,4-diaminobutane, N,N,N',N'-tetramethyl-1,5-diaminopentane.

A preferable diamine compound is a diamine compound in which an alkylene group ($R_9$) that links two nitrogen atoms has 2 or 3 carbon atoms.

The amount of these diamine compounds to be used is not particularly limited. The diamine compound is usually used in the range of 0.01 mol to 10 mol based on 100 mol of the phenol compound to be used.

Other component that forms the polymerization catalyst will be described.

The polymerization catalysts used in the polymerization step may contain the catalyst component described above, and further, for example, tertiary monoamine compounds or secondary monoamine compounds singly or in combination.

The tertiary monoamine compound refers to aliphatic tertiary amines including alicyclic tertiary amine.

Examples of tertiary monoamines include trimethylamine, triethylamine, tripropylamine, tributylamine, triisobutylamine, dimethylethylamine, dimethylpropylamine, allyldiethylamine, dimethyl-n-butylamine, diethylisopropylamine, and N-methylcyclohexylamine.

These tertiary monoamines may be used singly or in combinations of two or more. The amount of the tertiary monoamine to be used is not particularly limited. Preferably, the amount is 15 mol or less based on 100 mol of the phenol compound to be polymerized.

As the secondary monoamine compound, secondary aliphatic amines can be used.

Examples of the secondary aliphatic amines include dimethylamine, diethylamine, di-n-propylamine, di-i-propylamine, di-n-butylamine, di-i-butylamine, di-t-butylamine, dipentylamines, dihexylamines, dioctylamines, didecylamines, dibenzylamines, methylethylamine, methylpropylamine, methylbutylamine, and cyclohexylamine.

As the secondary monoamine compound, secondary monoamine compounds containing aromatic groups can also be used. Examples thereof include N-phenylmethanolamine, N-phenylethanolamine, N-phenylpropanolamine, N-(m-methylphenyl)ethanolamine, N-(p-methylphenyl)ethanolamine, N-(2',6'-dimethylphenyl)ethanolamine, N-(p-chlorophenyl)ethanolamine, N-ethylaniline, N-butylaniline, N-methyl-2-methylaniline, N-methyl-2,6-dimethylaniline, and diphenylamine. The secondary monoamine compounds above may be used singly or in combinations of two or more. The amount of the secondary monoamine compound to be used is not particularly limited. The amount is suitably 15 mol or less based on 100 mol of the phenol compound to be polymerized.

The post treatment method after the polymerization reaction is completed is not particularly limited. Examples of the post treatment method usually include a method in which an acid such as hydrochloric acid and acetic acid, ethylenediaminetetraacetic acid (EDTA) and salts thereof, nitrilotriacetic acid and salts thereof, or the like is added to the reaction solution to deactivate the catalyst.

In the polyphenylene ether according to the present embodiment, a method in which a polyphenylene ether solution (oil phase) having polyphenylene ether dissolved in a good solvent is contacted with an aqueous solution (aqueous phase) in which an acid such as hydrochloric acid and acetic acid, ethylenediaminetetraacetic acid (EDTA) and salts thereof, nitrilotriacetic acid and salts thereof, or the like are dissolved is preferable from the viewpoint of reduction in the amount of a remaining metal catalyst. Particularly, the remaining metal catalyst can be efficiently removed in the following case: when the metal catalyst is added to the aqueous phase, and subsequently the oil phase is separated from the aqueous phase, the viscosity of the oil phase is controlled to be 10 cP or less; thereby, the remaining metal catalyst can be efficiently removed without recombining the metal catalyst with polyphenylene ether. Preferably, the viscosity of the oil phase is controlled to be preferably 8 cP or less, more preferably 6 cP or less, and still more preferably 4 cP or less.

The polyphenylene ether may be obtained from the slurry polymerization or the solution polymerization. In the case of the polyphenylene ether obtained by the slurry polymerization, the polyphenylene ether once deposited is dissolved in the good solvent to control the viscosity thereof to be within the range above. Thereby, a polyphenylene ether having an extremely small amount of a remaining metal catalyst can be obtained. In the case of the solution polymerization, the amount of the good solvent to be used is smaller than that in the slurry polymerization. Accordingly, from the viewpoint of the environmental load, the solution polymerization is preferably selected. The good solvent refers to a solvent that can dissolve the polyphenylene ether. The good solvents may be used singly or in combinations of two or more. Among these, examples of preferable good solvents include aromatic hydrocarbons such as benzene, toluene, xylene, ethylbenzene, styrene; and halogenated hydrocarbons such as chlorobenzene and dichlorobenzene.

In the polyphenylene ether obtained by the solution polymerization, the viscosity thereof is controlled to be within the above using the polyphenylene ether solution when the polymerization is completed. Thereby, a polyphenylene ether having an extremely small amount of the remaining metal catalyst can be obtained.

The polyphenylene ether is precipitated and deposited in the polymerization solution when the polymerization is completed. Then, in order to wash and remove the catalyst, preferably, a washing treatment is repeatedly performed using a solution whose main component is a solvent having a low ability to dissolve the polyphenylene ether.

Then, a drying treatment is performed using a variety of dryers. Thereby, the polyphenylene ether can be recovered as powder.

The drying treatment is performed at a temperature at least 60° C. or more, preferably 80° C. or more, more preferably 120° C. or more, still more preferably 140° C. or more, and further still more preferably 150° C. or more.

If the polyphenylene ether is dried at 60° C. or less, the content of aromatic hydrocarbon in the polyphenylene ether may not be efficiently controlled to be less than 1.5% by mass.

In order to obtain the polyphenylene ether with high efficiency, a method for increasing a drying temperature, a method for increasing the degree of vacuum in a drying atmosphere, a method for performing stirring during drying, and the like are effective. Particularly, a method for increasing a drying rate is preferable from the viewpoint of production efficiency.

In the drying step, a mixer is preferably used in combination. Examples of the mixer include stirring type dryers and rotary dryers. Thereby, a large amount can be treated, and productivity can be kept high.

The reduced viscosity of the polyphenylene ether according to the present embodiment (0.5 dl/g chloroform solution, measured at 30° C.) is preferably within the range of 0.20 to 0.40 dl/g, and more preferably within the range of 0.25 dl/g to 0.35 dl/g.

The polyphenylene ether may be a polyphenylene ether obtained by blending two or more polyphenylene ethers having different reduced viscosities. For example, the polyphenylene ether may be a mixture of a polyphenylene ether having a reduced viscosity of 0.40 dl/g or less and a polyphenylene ether having a reduced viscosity of 0.45 dl/g or more. The reduced viscosity of the mixture thereof is preferably within the range of 0.20 to 0.40 dl/g.

As an index indicating the coloring properties of the polyphenylene ether, the Color Index (C.I.) can be used. Often, the polyphenylene ether is melt kneaded with other resin and used. It is known that the polyphenylene ether is colored by heating. For this reason, as the Color Index value of the polyphenylene ether after heating is smaller, a polyphenylene ether having a good color tone is obtained. Examples of the "polyphenylene ether after heating" include polyphenylene ether after melt kneading, polyphenylene ether after molding processing, and polyphenylene ether after compression. As an example of representative methods, a method for compressing the polyphenylene ether at 310° C. for 20 minutes at a pressure of 10 MPa and measuring the Color Index value of the polyphenylene ether (C.I. heat) is simple.

In the present embodiment, the Color Index of the polyphenylene ether is determined as follows.

The polyphenylene ether is dissolved in chloroform to prepare a chloroform solution having a concentration of the polyphenylene ether of 0.05 g/mL.

The same chloroform used to dissolve the polyphenylene ether is put into a quartz cell having a cell length of 1 cm. Using ultraviolet light (wavelength of 480 nm), the absorbance of pure chloroform is measured, and defined as the absorbance 0.

The chloroform solution of the polyphenylene ether above is put into the same cell, and the absorbance at 480 nm is measured.

A value obtained by subtracting the absorbance of pure chloroform from the absorbance of the polyphenylene ether solution, and dividing the obtained value by the concentration of the polyphenylene ether in the polyphenylene ether solution is defined as the Color Index of the polyphenylene ether (C.I.).

A larger Color Index value indicates that a degree of the coloring of the polyphenylene ether is larger. From the viewpoint of the color tone, the Color Index value after heating (C.I. heat) is preferably smaller. Specifically, the Color Index value after heating is preferably 4.0 or less, more preferably 3.5 or less, still more preferably 3.0, and most preferably 2.5 or less.

As the index indicating purity of the polyphenylene ether, the amount of the remaining metal catalyst can be used.

In the polyphenylene ether according to the present embodiment, the amount of the remaining metal catalyst is preferably 1.0 ppm or less.

As described above, in the method of producing polyphenylene ether according to the present embodiment, the polyphenylene ether having the amount of the remaining metal catalyst within the range above can be obtained, for example, by controlling the polymerization time, the viscosity of the solution during extraction, and the refining operation.

In the present embodiment, the amount of the remaining metal catalyst in the polyphenylene ether can be measured using an atomic absorption spectrophotometer.

From the viewpoint of high purity of the polyphenylene ether, the amount of the remaining metal catalyst in the polyphenylene ether is preferably 1.0 ppm or less. Further, the amount of the remaining metal catalyst is preferably 1.0 ppm or less, more preferably 0.8 ppm or less, still more preferably 0.6 ppm or less, further still more preferably 0.4 ppm or less, and the most preferably 0.2 ppm or less because the Color Index value after heating (C.I. heat) can be suppressed.

In the present embodiment, known various stabilizers can also be suitably used to stabilize the polyphenylene ether. Examples of the stabilizers include metallic stabilizers such as zinc oxide and zinc sulfide; and organic stabilizers such as hindered phenol-based stabilizers, phosphoric acid ester stabilizers, and hindered amine stabilizers. A preferable amount of the stabilizer to be blended is less than 5 parts by mass based on 100 parts by mass of the polyphenylene ether. Among stabilizers, particularly preferable is an antioxidant having a sulfur element and a hydroxyl group concurrently in the molecule. Examples of specific trade names for the antioxidant include Irganox 1520 or Irganox 1726 available from Ciba Specialty Chemicals Inc. These stabilizers are extremely effective from the viewpoint of preventing discoloring of the pellet due to the oxidation reaction.

As the polyphenylene ether, a modified polyphenylene ether may also be used. Examples of the modified polyphenylene ether include polyphenylene ethers to which 0.01 to 10% by mass of a styrene-based monomer or a derivative thereof is grafted or added. The mixing proportion of the polyphenylene ether to the modified polyphenylene ether is not particularly limited. The polyphenylene ether and the modified polyphenylene ether can be mixed in any proportion.

<<Resin Composition>>

The resin composition according to the present embodiment comprises the polyphenylene ether (a) above and a hydrogenated block copolymer (b) prepared by hydrogenating a block copolymer comprising at least two polymer blocks A mainly containing a vinyl aromatic compound and at least one polymer block B mainly containing a conjugated diene compound, wherein the number average molecular weight (Mnb) of the hydrogenated block copolymer is 100,000 or less and the number average molecular weight (MnbA) of at least one polymer block of the polymer blocks A is 8,000 or more; wherein the amount of the polyphenylene ether (a) is 1 to 99% by mass and the amount of the hydrogenated block copolymer (b) is 99 to 1% by mass where the total amount of the polyphenylene ether (a) and the hydrogenated block copolymer (b) is 100% by mass.

Such a resin composition containing specific amounts of the components (a) and (b) has high fluidity, mechanical properties, and transparency.

Hereinafter, the component (b) will be described in detail.

[Component (b)]

The hydrogenated block copolymer (b) used in the present embodiment is prepared by hydrogenating at least part of the block copolymer comprising at least two polymer blocks A mainly containing a vinyl aromatic compound and at least one polymer block B mainly containing a conjugated diene compound. Further, the number average molecular weight (Mnb)

of the hydrogenated block copolymer is 100,000 or less, and the number average molecular weight (MnbA) of at least one polymer block of the polymer blocks A is 8,000 or more.

(Polymer Block A Mainly Containing Vinyl Aromatic Compound)

The polymer block A mainly containing a vinyl aromatic compound is a homopolymer block of a vinyl aromatic compound, or a copolymer block of a vinyl aromatic compound and a conjugated diene compound. In the polymer block A, "mainly containing a vinyl aromatic compound" designates that more than 50% by mass of the vinyl aromatic compound is contained in the polymer block A. Preferably, 70% by mass or more of the vinyl aromatic compound is contained.

The content of the polymer block A in the hydrogenated block copolymer (b) is preferably 15 to 50% by mass, more preferably 25 to 45% by mass, and still more preferably 30 to 45% by mass based on the entire hydrogenated block copolymer (b). At a content of the polymer block A within the range above, a resin composition having high fluidity, mechanical properties, and transparency tends to be obtained.

Examples of the vinyl aromatic compound that forms the polymer block A include styrene, α-methylstyrene, vinyltoluene, p-tert-butylstyrene, and diphenylethylene. These may be used singly or in combinations of two or more. Among these, styrene is preferable.

The number average molecular weight (Mnb) of the component (b) can be measured using a gel permeation chromatography System 21 made by Showa Denko K.K. (column: one K-G made by Showa Denko K.K., one K-800RL, and one K-800R connected in this order in series, column temperature: 40° C., solvent: chloroform, flow rate of the solvent: 10 ml/min, sample concentration: 1 g/L chloroform solution of the hydrogenated block copolymer) by creating a calibration curve using standard polystyrenes (molecular weights of the standard polystyrenes are 3650000, 2170000, 1090000, 681000, 204000, 52000, 30200, 13800, 3360, 1300, and 550). The wavelength of the UV (ultraviolet light) in the detecting unit is set at 254 nm for both the standard polystyrenes and the hydrogenated block copolymer, and the measurement is performed.

In the case of an A-B-A type structure, for example, the number average molecular weight (MnbA) of the polymer block A mainly containing a vinyl aromatic compound in the hydrogenated block copolymer (b) can be determined by the calculation expression: (MnbA)=(Mnb)×proportion of the amount of bonded vinyl aromatic compound÷2; on the premise that based on the number average molecular weight (Mnb) of the hydrogenated block copolymer above, the molecular weight distribution of the hydrogenated block copolymer is 1, and the two polymer blocks A mainly containing a vinyl aromatic compound having the same molecular weight exist. Similarly, in the case of an A-B-A-B-A type hydrogenated block copolymer, the number average molecular weight (MnbA) can be determined by the calculation expression: (MnbA)=(Mnb)×proportion of the amount of bonded vinyl aromatic compound÷3. In the case where the sequence of the block structure A and the block structure B is clear at a stage of synthesizing the vinyl aromatic compound-conjugated diene block copolymer, without depending on the calculation expression above, the number average molecular weight (MnbA) may be calculated based on the measured number average molecular weight (Mnb) of the hydrogenated block copolymer from the proportion of the block structure A.

The number average molecular weight (MnbA) of the polymer block A contained in the component (b) is 8,000 or more, and preferably 9,000 or more. The upper limit of the number average molecular weight (MnbA) of the polymer block A is preferably 30,000 or less. The hydrogenated block copolymer that meets the conditions can dissolve the polyphenylene ether (a) well, where the polyphenylene ether (a) contains 5 to 20% by mass of the component having a molecular weight of 50,000 or more and 12 to 30% by mass of the component having a molecular weight of 8,000 or less. Such a hydrogenated block copolymer also provides significant advantages in the fluidity and mechanical properties of the resin composition to be obtained. Improvement in the total light transmittance, which is one of effects of the invention, is obtained. It is presumed that this is because by controlling the amount of the component having a molecular weight of 8,000 or less in the component (a) and the number average molecular weight (MnbA) of the polymer block A in the component (b) within the specific ranges, the compatibility of the component (a) with the component (b) is close to a molecule compatible system. The total light transmittance can be measured using a turbidity meter (NDH2000: made by Nippon Denshoku Industries Co., Ltd.), for example (according to JIS K7361). It is also presumed that the reason why impact resilience is improved is: the vinyl aromatic compound (hard segment) portion in the component (b) and the component (a) are close to the molecule compatible system; thereby, the aggregation force of the hard segment is increased, and the conjugated diene compound (soft segment) contributes to the impact resilience efficiently.

The number average molecular weight (Mnb) of the component (b) is controlled to be 100,000 or less. This is because the component (b) needs to preferably be diffused within the system in melt mixing with the component (a). In the case where the number average molecular weight (Mnb) of the component (b) is 100,000 or less, a preferable diffusion state can be attained. The number average molecular weight (Mnb) of the component (b) is preferably 98,000 or less.

(Polymer Block B Mainly Containing Conjugated Diene Compound)

The polymer block B mainly containing a conjugated diene compound is a homopolymer block of a conjugated diene compound or a random copolymer block of a conjugated diene compound and a vinyl aromatic compound. In the polymer block B, "mainly containing a conjugated diene compound" means that more than 50% by mass of the conjugated diene compound is contained in the polymer block B. Preferably, 70% by mass or more of the conjugated diene compound is contained.

Examples of the conjugated diene compound that forms the polymer block B include butadiene, isoprene, 1,3-pentadiene, and 2,3-dimethyl-1,3-butadiene. These may be used singly or in combinations of two or more. Among these, butadiene, isoprene, and a combination thereof are preferable.

In the microstructure of the polymer block B (bonding form of the conjugated diene compound), the total amount of the amount of the 1,2-vinyl bond and the amount of the 3,4-vinyl bond (hereinafter, referred to as the "total amount of the vinyl bonds" in some cases) is preferably 30 to 90% by mass, more preferably 35 to 90% by mass, still more preferably 45 to 90% by mass, and particularly preferably 70 to 90% by mass based on the entire conjugated diene compound in the component (b). At a total amount of the vinyl bonds of more than 90% by mass, industrial-scale production may be difficult. At a total amount of the vinyl bonds of less than 30% by mass, the balance of tensile elongation at break and moldability may be worsened.

When the block polymer A is "A" and the block polymer B is "B", examples of the component (b) include hydrogenated products of vinyl aromatic-conjugated diene compound block copolymers having a structure in which block units are bonded to form an A-B-A type, an A-B-A-B type, a B-A-B-A type, an (A-B-)$_n$-X type (wherein n is an integer of 1 or more, and X represents a reaction residue of a polyfunctional coupling agent such as silicon tetrachloride and tin tetrachloride, or a residue of an initiator such as a polyfunctional organic lithium compound), an A-B-A-B-A type, or the like. Among these, the hydrogenated block copolymer having the A-B-A-B type structure or the B-A-B-A type structure is more preferable because such a hydrogenated block copolymer has higher fluidity than that of the A-B-A type hydrogenated block copolymer.

The content of the bonded vinyl aromatic compound in the component (b) is preferably 15 to 50% by mass, more preferably 25 to 45% by mass, and still more preferably 30 to 45% by mass based on the entire component (b). At a content of the vinyl aromatic compound of 15% by mass or more, mechanical strength tends to be improved. At a content of 50% by mass or less, heat resistance and mechanical strength tend to be well balanced. In the present embodiment, the content of the vinyl aromatic compound can be measured by NMR.

The molecule structure of the block copolymer containing the block polymer A and the block polymer B is not particularly limited. For example, the molecule structure may be linear, branched, radial, or any combination of these. In the polymer block A or the polymer block B, the distribution of the vinyl aromatic compound or the conjugated diene compound in the chain of the polymer block may be random, tapered (the monomer component is increased or decreased along the chain), partially blocked, or any combination thereof. In the case where two or more polymer blocks A or two or more polymer blocks B exist in the repeating unit, the two or more polymer blocks may have the same structure or different structures.

The hydrogenation rate of the conjugated diene compound in the component (b) is not particularly limited. The hydrogenation rate is preferably 50% or more, more preferably 80% or more, and still more preferably 90% or more of the double bond derived from conjugated diene compound. In the present embodiment, the hydrogenation rate can be measured by NMR.

A method of producing the hydrogenated block copolymer as the component (b) is not particularly limited, and the hydrogenated block copolymer can be obtained by a known production method. Examples of the known production method include methods described in Japanese Patent Laid-Open Nos. 47-11486, 49-66743, 50-75651, 54-126255, 56-10542, 56-62847, 56-100840, and 2-300218, British Patent No. 1130770, U.S. Pat. Nos. 3,281,383 and 3,639,517, British Patent No. 1020720, and U.S. Pat. Nos. 3,333,024 and 4,501,857.

The hydrogenated block copolymer as the component (b) may be a modified hydrogenated block copolymer obtained by reacting the hydrogenated block copolymer with an α,β-unsaturated carboxylic acid or a derivative thereof (an ester compound or an acid anhydride compound) in the presence of or in the absence of a radical generator at 80 to 350° C. in a molten state, a solution state, or a slurry state. In this case, preferably, the α,β-unsaturated carboxylic acid or a derivative thereof is grafted or added to the hydrogenated block copolymer in the proportion of 0.01 to 10% by mass. Further, the hydrogenated block copolymer as the component (b) may be a mixture of the hydrogenated block copolymer above and the modified hydrogenated block copolymer in any proportion.

In the case where the resin composition further comprises a polypropylene (c) described later, an emulsifying dispersant for making the incompatible polyphenylene ether (a) miscible with the polypropylene (c) (hereinafter, abbreviated to a compatibilizer) is essential. In the present embodiment, the hydrogenated block copolymer (b) having a specific structure can be used as the compatibilizer. In the case where the component (b) is used as the compatibilizer, the component (b) is preferably a hydrogenated block copolymer obtained by hydrogenating a block copolymer comprising at least two polymer blocks A mainly containing styrene and at least one polymer block B mainly containing butadiene whose amount of the 1,2-vinyl bond is 70 to 90%.

The at least one polymer block B mainly containing butadiene may be a single polymer block whose amount of the 1,2-vinyl bond is 70 to 90% in butadiene before hydrogenation, or may be a polymer block B mainly containing butadiene comprising at least one polymer block B1 mainly containing butadiene whose amount of the 1,2-vinyl bond is 70 to 90% and at least one polymer block B2 mainly containing butadiene whose amount of the 1,2-vinyl bond is 30 to less than 70% in combination. The block copolymer having such a block structure is represented by A-B2-B1-A, for example, and can be obtained by a known polymerization method in which the amount of the 1,2-vinyl bond is controlled based on a feed sequence of monomer units adjusted. The bonding form of the butadiene before hydrogenation can be known using an infrared spectrophotometer, NMR, or the like.

When the total amount of the polyphenylene ether (a) and the hydrogenated block copolymer (b) is 100% by mass in the resin composition according to the present embodiment, the content of the polyphenylene ether (a) is 1 to 99% by mass, preferably 5 to 95% by mass, and more preferably 7 to 93% by mass. The content of the hydrogenated block copolymer (b) is 1 to 99% by mass, preferably 5 to 95% by mass, and more preferably 7 to 93% by mass. The resin composition comprising the components (a) and (b) in the ranges above tends to have high fluidity, mechanical properties, and transparency.

In the case where the resin composition according to the present embodiment comprises the component (c) described later, it is important to control the number average molecular weight (Mnb) of the component (b) to be 100,000 or less because the hydrogenated block copolymer (b) in the resin composition plays a role as the emulsifying dispersant (compatibilizer) between polymer (polypropylene) and polymer (polyphenylene ether). Namely, in order to emulsify the polymer having high viscosity (polypropylene) and the polymer (polyphenylene ether) in a molten bulk state, the hydrogenated block copolymer (b) as the emulsifying dispersant (compatibilizer) needs to preferably diffuse within the melt mixing system. For this reason, considering the melt viscosity of the hydrogenated block copolymer (b), it is important that the number average molecular weight (Mnb) of the component (b) is 100,000 or less.

Moreover, control of the number average molecular weight (MnbA) of the at least one polymer block of the polymer blocks A to be 8,000 or more is the condition that should be satisfied in order to make the polyphenylene ether (a) miscible with the hydrogenated block copolymer (b) to emulsify and disperse the polyphenylene ether well in the emulsifying and dispersion of the polymer-(polypropylene)-polymer (polyphenylene ether), and provide significant advantages to heat resistance, mechanical properties and processability of the resin composition to be obtained. The relationship between the molecular weight of the polyphenylene ether (a) to be emulsified and dispersed and the number average molecular weight of the polymer block A of the hydrogenated block copolymer (b) as the emulsifying dispersant (compatibilizer) is important to a polymer dispersion technique to attain the optimal emulsifying and dispersion between polymer (polypropylene) and polymer (polyphenylene ether). The resin composition according to the present embodiment is achieved by paying attention to the polymer emulsifying and dispersion technique not known in the related art.

From the viewpoint of enhancing the effect of the hydrogenated block copolymer (b) as the compatibilizing agent, in addition to the polyphenylene ether (a), further, a polystyrene-based resin such as polystyrene, syndiotactic polystyrene, or high impact polystyrene is preferably added. It is presumed that existence of the polystyrene-based resin allows proper control of the compatibility of the polyphenylene ether (a) with the polystyrene-based resin (b) such that a larger amount of the hydrogenated block copolymer (b) can act as the compatibilizer for polypropylene.

As the mixing proportion of the polyphenylene ether (a) to the polystyrene-based resin, preferably, the amount of the polyphenylene ether is 50% by mass or more, and the amount of the polystyrene-based resin is less than 50% by mass wherein the total amount of the polyphenylene ether (a) and the polystyrene-based resin is 100% by mass. More preferably, the amount of the polyphenylene ether (a) is 60% by mass or more, and the amount of the polystyrene resin is less than 40% by mass. If the polystyrene-based resin is further added within the range above, the resin composition to be obtained tends to have high fluidity and rigidity.

A method for using the resin composition according to the present embodiment is a method for improving the heat resistance of the polypropylene (c) by adding the resin composition comprising the components (a) and (b) above to the polypropylene (c). The proportion of the components (a) to (c) is as described later.

[Component (c)]

The resin composition according to the present embodiment may further comprise the polypropylene (c) in addition to the components (a) and (b) above. The content of the polypropylene (c) is preferably 1 to 95% by mass, and more preferably 5 to 90% by mass wherein the total amount of the components (a) to (c) is 100% by mass. Further, the resin composition comprising the polypropylene (c) has high processability, heat resistance, and mechanical properties. The polypropylene as the component (c) is a crystalline propylene homopolymer, or a crystalline propylene-ethylene block copolymer having a crystalline propylene homopolymer portion obtained in a first step of polymerization and a propylene-ethylene random copolymer portion obtained by copolymerizing propylene, ethylene, and/or at least one other α-olefin (such as butene-1 and hexene-1) in a second step or later of the polymerization. Further, the polypropylene may be a mixture of the crystalline propylene homopolymer and the crystalline propylene-ethylene block copolymer.

The polypropylene (c) may be a mixture of at least two polypropylenes having different molecular weights. Moreover, the polypropylene (c) comprises a homopolypropylene and/or a block polypropylene. The melt flow rate (MFR: measured according to ASTM D1238 at 230° C. and a load of 2.16 kg) of the homopolypropylene and/or the block polypropylene is preferably 0.1 to 100 g/10 min. The melt flow rate is more preferably 0.2 to 95 g/10 min, and still more preferably 0.3 to 90 g/10 min.

A resin composition comprising such a polypropylene (c) tends to have high processability, heat resistance, and mechanical properties.

The polypropylene (c) is usually obtained by polymerizing a monomer in the presence of a titanium trichloride catalyst or a halogenated titanium catalyst carried on a carrier such as magnesium chloride and an alkylaluminum compound at a polymerization temperature in the range of 0 to 100° C. and a polymerization pressure in the range of 3 to 100 atmospheres. At this time, a chain transfer agent such as hydrogen can be added to control the molecular weight of the polymer. The polymerization method can be any of a batch method or a continuous method. A method such as solution polymerization and slurry polymerization under a solvent such as butane, pentane, hexane, heptane, and octane can also be selected. Further, bulk polymerization in a monomer and a gaseous phase polymerization in a gaseous monomer under no solvent can also be used.

Further, in addition to the polymerization catalyst above, an electron donating compound as a third component can be used as an internal donor component or external donor component to enhance the isotacticity and polymerization activity of the polypropylene to be obtained. As these electron donating compounds, known compounds can be used. Examples thereof include ester compounds such as ε-caprolactone, methyl methacrylate, ethyl benzoate, and methyl toluate; phosphorous acid esters such as triphenyl phosphite and tributyl phosphite; phosphoric acid derivatives such as hexamethylphosphoric triamide; alkoxyester compounds; aromatic monocarboxylic acid esters and/or aromatic alkylalkoxysilanes; aliphatic hydrocarbon alkoxysilanes; a variety of ether compounds; and a variety of alcohols and/or a variety of phenols.

The polypropylene (c) is obtained by the method above. The polypropylene has the following features of the polymer: a homo-polypropylene portion preferably has a crystal melting point of 155° C. or more, and a crystallization temperature is preferably 100° C. to 130° C. The crystal melting point of the homo-polypropylene portion is a value of the melting point measured using a differential scanning calorimeter (DSC: for example, DSC-2 type made by PerkinElmer Inc.) at a temperature raising rate of 20° C./min and a temperature falling rate of 20° C./min. To describe the crystal melting point more in detail, first, approximately 5 mg of a sample is kept at 20° C. for 2 minutes. Then, the temperature is raised at 20° C./min to 230° C., and kept at 230° C. for 2 minutes. Then, the temperature is reduced at a temperature falling rate of 20° C./min to 20° C., and kept at 20° C. for 2 minutes. The top peak temperature of endothermic peaks that appear when temperature is raised at a temperature raising rate of 20° C./min can be determined as the melting point. The polypropylene having a melting point less than 155° C. tends to reduce the rigidity and heat resistance (deflection temperature under load: DTUL) of the resin composition to be obtained. More preferably, the polypropylene has the homo-polypropylene portion having a crystal melting point of 163° C. or more. Thereby, a resin composition having higher rigidity and heat resistance (deflection temperature under load: DTUL) is attained. The peak of the crystallization temperature (solidifying temperature) of the molten polypropylene can be known during the measurement of the crystal melting point by the differential scanning calorimeter (DSC). Thereby, it can be found that the crystallization temperature of the polypropylene is in the range of a temperature of 100° C. to 130° C.

As the weight average molecular weight of the polypropylene (c), the amount of the component having a molecular weight of 1,000,000 or more can be selected from the range of 5 to 30% by mass based on the entire polypropylene. In the case where great importance is placed on the heat-resistant creep properties and/or mechanical strength of the resin composition to be obtained, the amount of the component having a molecular weight of 1,000,000 or more is preferably 10 to 30% by mass, and more preferably 15 to 28% by mass. In the case where great importance is placed on the processability of the resin composition to be obtained, the amount of the component having a molecular weight of 1,000,000 or more is preferably 5 to 20% by mass, and more preferably 7 to 17% by mass. When polypropylene and polyphenylene ether are melt kneaded (thermally processed), polypropylene is cut from a polypropylene unit having a long chain. If the polypropylene having the amount of the component above is used, an influence of cutting the chain is small, and the resin composition to be obtained tends to have high heat-resistant creep properties and mechanical strength.

The weight average molecular weight of the polypropylene (c) can be measured using an Alliance GPC2000 type made by Waters Corporation (column temperature: 140° C., solvent: o-dichlorobenzene, flow rate of the solvent: 1.0 ml/min, sample concentration: 0.15%) by creating a calibration curve using standard polystyrene.

In the case where the processability of the resin composition is further improved, the polypropylene (c) may be used in combination with a polypropylene having a melt flow rate (MFR: measured according to ASTM D1238 at 230° C. and a load of 2.16 kg) of 0.1 to 100 g/10 min. The mixing ratio of the polypropylene containing 5 to 30% by mass of the component having a molecular weight of 1,000,000 or more to the polypropylene having an MFR of 0.1 to 100 g/10 min is preferably 50/50 to 1/99.

The polypropylene (c) may be the polypropylene (c) above, or a known modified (0.01 to 10% by mass of α,β-unsaturated carboxylic acid or a derivative thereof is grafted or added) polypropylene obtained by reacting the polypropylene with the α,β-unsaturated carboxylic acid or a derivative thereof in the presence of or in the absence of a radical generator in a molten state or a solution state under a temperature of 30 to 350° C. Further, the polypropylene (c) may be a mixture of the polypropylene above and the modified polypropylene in any proportion.

The resin composition according to the present embodiment is a resin composition comprising the components (a) to (c) above, formed of the components having the features described above, and preferably having two features below.

<<Feature 1>>

The resin composition according to the present embodiment is a resin composition in which as the morphology of the resin composition, the polyphenylene ether (a) and the hydrogenated block copolymer (b) as the dispersed phase are dispersed in the polypropylene resin (c) as a matrix phase.

<<Feature 2>>

The resin composition according to the present embodiment is a resin composition in which the circle-equivalent average particle size (D1) of the polyphenylene ether (a) dispersed in the resin composition (a resin pellet or a resin molded article) thermally relaxes the dispersed phase by a heating melting test in which the resin composition is left as it is, and preferably, the circle-equivalent average particle size (D1) is smaller than the circle-equivalent average particle size (D2) of the polyphenylene ether (a) dispersed in the resin composition after the test, (D2/D1)≤5, and a thermally stable dispersion state is shown.

The heating melting test in which the resin composition is left as it is means a test in which a mechanical dispersion factor (mechanical mixing factor by an extruder or an injection molding machine) between polymer (polypropylene) and polymer (polyphenylene ether) is removed in synthesis of a incompatible polymer alloy, and the emulsifying and dispersion effect of the emulsifying dispersant (compatibilizer) is checked. In the heating melting test in which the resin composition is left as it is, using a heat compression molding machine, resin pellets or pieces of a resin molded article are heat compression molded in a metal mold measuring a length of 54 mm×a width of 41 mm×a thickness of 2 mm at a temperature of 260° C. and a pressure of 10 kg/cm$^2$ for 10 minutes, and immediately cooled for 5 minutes using a cooling press at 10° C. to obtain a compression molded plate. To check the dispersion state of the polyphenylene ether (a) dispersed in the compression molded plate, the central portion of the thickness in the central compressed plate is machined parallel to the surface of the plate, and the dispersion state is checked. As a method for checking the dispersion state, the dispersion state can be easily checked and measured using a transmission electron microscope. For example, a sample is oxidation dyed using a heavy metal compound such as ruthenium tetrachloride. An ultra thin section is cut out using an ultramicrotome or the like. The section is observed using a transmission electron microscope (for example, observed at a magnification of 10000 times). Thereby, a photograph or an image of the sample can be obtained. The dispersion diameter of the polyphenylene ether (a) obtained here can be determined as a circle-equivalent average particle size usually using an image processing apparatus.

Here, the circle-equivalent average particle size is the value which is calculated as the circular particle diameter when the whole circumference of the dispersing particle in the morphology obtained using the transmission electron microscope is measured and is regarded as the circumference of a circle. As a method for obtaining the dispersion state, specifically, an ultra thin section is produced from resin pellets or pieces of a resin molded article using a microtome (made by Reichert GmbH, ULTRACUT E). The section is dyed with ruthenium acid, and observed using a transmission electron microscope (made by JEOL, Ltd., 1200EX). Based on the transmission electron microscope photograph obtained, using an image analyzer (such as IP1000 made by Asahi Kasei Corporation), the equivalent circular diameter is determined from the circumferential length of the dispersed phase. Thereby, the average particle size and particle size distribution can be determined.

According to the emulsifying and dispersion stability between polymer (polypropylene) and polymer (polyphenylene ether) which can be known by the method above, in the case where the polyphenylene ether (a) has poor emulsifying and dispersion stability (D2/D1>5), the physical properties of the resin composition may be degraded, or no stable physical properties can be obtained. Namely, from the viewpoint of the emulsifying and dispersion stability and heat resistance, mechanical properties and processability as the performance of the composition, as the emulsifying dispersant (compatibilizer), the polymer alloy obtained by emulsifying and dispersing the polyphenylene ether (a) comprising 5 to 20% by mass of the component having a molecular weight of 50,000 or more and 12 to 30% by mass of the component having a molecular weight of 8,000 or less in the polypropylene (c), in which the polypropylene (c) forms the matrix phase and the polyphenylene ether (a) forms the dispersed phase, preferably comprises a hydrogenated block copolymer (b) obtained by hydrogenating the block copolymer comprising the at least two polymer blocks A mainly containing styrene and the at least one polymer block B mainly containing butadiene whose amount of the 1,2-vinyl bond is 70 to 90%, wherein the amount of bonded styrene is 15 to 50% by mass, the number average molecular weight Mnb ≤ 100,000, and the number average molecular weight (MnbA) of the polymer block A mainly containing styrene ≥ 8,000.

From the viewpoint of further improvement in the physical properties, other component can also be blended with the resin composition according to the present embodiment. Examples of the other component include components (d) to (f) below.

[Component (d)]

The component (d) is a hydrogenated block copolymer (d) prepared by hydrogenating a block copolymer comprising at least two polymer blocks A mainly containing a vinyl aromatic compound and at least one polymer block B mainly containing a conjugated diene compound, wherein the number average molecular weight (Mnd) of the hydrogenated block copolymer is 150,000 or less; the number average molecular weight (MndA) of at least one polymer block of the polymer blocks A is 8,000 or more; the content of the polymer block A is more than 50% by mass and 70% by mass or less based on the entire component (d); in the bonding form of the conjugated diene compound in the polymer block B, the total amount of the conjugated diene compound bonded with a 1,2-vinyl bond or a 3,4-vinyl bond is 25 to 70% by mass based on the entire conjugated diene compound.

In the present embodiment, the component (d) is a hydrogenated block copolymer different from the component (b) described above and a component (e) described later.

The hydrogenated block copolymer (d) is a hydrogenated product of a vinyl aromatic compound-conjugated diene block copolymer having a structure in which block units are bonded to form the A-B-A type, the A-B-A-B type, the (A-B-)$_n$-X type (wherein n is an integer of 1 or more, and X represents a reaction residue of a polyfunctional coupling agent such as silicon tetrachloride and tin tetrachloride, or a residue of an initiator such as polyfunctional organic lithium compound), the A-B-A-B-A type, and the like. Among these, the hydrogenated block copolymer having the A-B-A-B type structure is more preferable because such a hydrogenated block copolymer has higher fluidity than that of the A-B-A type hydrogenated block copolymer.

The content of the vinyl aromatic compound bonded to the hydrogenated block copolymer (d) having the block structure described above is preferably 50 to 70% by mass, more preferably 53 to 68% by mass, and still more preferably 58 to 67% by mass based on the entire component (d). At a content of the vinyl aromatic compound of 50% by mass or more, heat resistance tends to be improved. At a content of 70% by mass or less, heat resistance and impact resistance tend to be well balanced.

To further mention each of the block structures, the polymer block A mainly containing a vinyl aromatic compound has a structure of a homopolymer block of a vinyl aromatic compound, or a copolymer block of a vinyl aromatic compound and a conjugated diene in which the copolymer block contains more than 50% by mass and preferably 70% by mass or more of the vinyl aromatic compound. Meanwhile, the polymer block B mainly containing a conjugated diene has a structure of a homopolymer block of a conjugated diene, or a copolymer block of a conjugated diene and a vinyl aromatic compound in which the copolymer block contains more than 50% by mass and preferably 70% by mass or more of the conjugated diene.

In the structures of the polymer block A mainly containing a vinyl aromatic compound and the polymer block B mainly containing a conjugated diene, the distribution of the vinyl aromatic compound or conjugated diene in the chain in the polymer block may be any combination of random distribution, tapered distribution (the monomer component is increased or decreased along the chain), and distribution partially having a block structure of 100% by mass of the vinyl aromatic compound or a block structure of 100% by mass of the conjugated diene. In the case where two or more polymer blocks A mainly containing a vinyl aromatic compound and two or more polymer blocks B mainly containing a conjugated diene exist, the polymer blocks of the same kind may have the same structure, or have different structures.

To further mention the polymer block B mainly containing a conjugated diene, the at least one polymer block B mainly containing a conjugated diene in the hydrogenated block copolymer (d) and used in the present embodiment may be a single polymer block in which the amount of the 1,2-vinyl bond of the conjugated diene before hydrogenation is 25 to 70%, or may be a polymer block B mainly containing a conjugated diene comprising at least one polymer block B1 mainly containing the conjugated diene whose amount of the 1,2-vinyl bond is 25 to 45% and at least one polymer block B2 mainly containing the conjugated diene whose amount of the 1,2-vinyl bond is more than 45 and less than 70% in combination. The block copolymer having such a block structure is represented by A-B2-B1-A, for example. The block copolymer can be obtained by a known polymerization method in which the amount of the 1,2-vinyl bond is controlled based on a feed sequence of monomer units adjusted. The bonding form of the conjugated diene before hydrogenation can be known usually using an infrared spectrophotometer, NMR, or the like.

In the microstructure of the polymer block B (bonding form of the conjugated diene compound) in the component (d), the total amount of the amount of the 1,2-vinyl bond and the amount of the 3,4-vinyl bond (hereinafter, referred to as the "total amount of the vinyl bonds" in some cases) is 25 to 70% by mass, preferably 30 to 60% by mass, and more preferably 40 to 55% by mass based on all the conjugated diene compounds in the component (d).

The aliphatic double bond of the polymer block B mainly containing a conjugated diene in the block copolymer can be hydrogenated. The hydrogenated block copolymer (hydrogenated product of the styrene-butadiene block copolymer) can be used as the component (d). The hydrogenation rate of the aliphatic double bond is preferably 80% or more. The hydrogenation rate can be known using an infrared spectrophotometer, NMR, or the like.

The hydrogenated block copolymer (d) has the structure above. Besides, the number average molecular weight (Mnd) of the hydrogenated block copolymer (d) is 150,000 or less, and the number average molecular weight (MndA) of the polymer block A mainly containing a vinyl aromatic compound is 8,000 or more.

The number average molecular weight (Mnd) of the hydrogenated block copolymer (d) can be measured using a gel permeation chromatography System 21 made by Showa Denko K. K. (column: one K-G made by Showa Denko K. K., one K-800RL, and one K-800R connected in this order in series, column temperature: 40° C., solvent: chloroform, flow rate of the solvent: 10 ml/min, sample concentration: 1 g/L chloroform solution of the hydrogenated block copolymer) by creating a calibration curve using standard polystyrenes (molecular weights of the standard polystyrenes are 3650000, 2170000, 1090000, 681000, 204000, 52000, 30200, 13800, 3360, 1300, and 550). The wavelength of the UV (ultraviolet light) in the detecting unit is set at 254 nm for both the standard polystyrenes and the hydrogenated block copolymer, and the measurement is performed.

In the case of the A-B-A type structure, for example, the number average molecular weight (MndA) of the polymer block A mainly containing a vinyl aromatic compound in the hydrogenated block copolymer (d) can be determined by the calculation expression: (MndA)=(Mnd)×proportion of the amount of bonded vinyl aromatic compound÷2; on the premise that based on the number average molecular weight (Mnd) of the hydrogenated block copolymer above, the molecular weight distribution of the hydrogenated block copolymer is 1, and two polymer blocks A mainly containing a vinyl aromatic compound having the same molecular weight exist. Similarly, in the case of the A-B-A-B-A type hydrogenated block copolymer (d), the number average molecular weight (MndA) can be determined by the calculation expression: (MndA)=(Mnd)×proportion of the amount of bonded vinyl aromatic compound÷3. In the case where the sequence of the block structure A and the block structure B is clear at a stage of synthesizing the vinyl aromatic compound-conjugated diene block copolymer, without depending on the calculation expression above, the number average molecular weight (MndA) may be calculated based on the measured number average molecular weight (Mnd) of the hydrogenated block copolymer from the proportion of the block structure A.

The hydrogenated block copolymer (d) may be obtained by any production method as long as the hydrogenated block copolymer (d) has the structure above. Examples of the known production methods include methods described in Japanese Patent Laid-Open Nos. 47-11486, 49-66743, 50-75651, 54-126255, 56-10542, 56-62847, 56-100840, and 2004-269665, British Patent No. 1130770, U.S. Pat. Nos. 3,281,383 and 3,639,517, British Patent No. 1020720, and U.S. Pat. Nos. 3,333,024 and 4,501,857.

The hydrogenated block copolymer as the component (d) may be the hydrogenated block copolymer above, or a modified (0.01 to 10% by mass of α,β-unsaturated carboxylic acid or a derivative thereof is grafted or added) hydrogenated block copolymer obtained by reacting the hydrogenated block copolymer with the α,β-unsaturated carboxylic acid or a derivative thereof (an ester compound or an acid anhydride compound such as maleic anhydride) in the presence of or in the absence of a radical generator in a molten state, a solution state, or a slurry state under a temperature of 80 to 350° C. Further, the hydrogenated block copolymer as the component (d) may be a mixture of the hydrogenated block copolymer above and the modified hydrogenated block copolymer in any proportion.

[Component (e)]

The component (e) is a hydrogenated block copolymer obtained by hydrogenating a block copolymer comprising at least two polymer blocks A mainly containing a vinyl aromatic compound and at least one polymer block B mainly containing a conjugated diene compound, wherein the number average molecular weight (Mne) of the hydrogenated block copolymer is 100,000 or less; the number average molecular weight (MneA) of at least one polymer block of the polymer blocks A is 8,000 or more; the content of the polymer block A is 15% by mass or more and 50% by mass or less based on the entire component (e); in the bonding form of the conjugated diene compound in the polymer block B, the total amount of the conjugated diene compound bonded with the 1,2-vinyl bond or the 3,4-vinyl bond is 25 to 70% by mass based on the entire conjugated diene compound.

In the present embodiment, the component (e) is a hydrogenated block copolymer different from the components (b) and (d) above.

The hydrogenated block copolymer (e) is a hydrogenated product of a styrene-butadiene block copolymer having a structure in which block units are bonded to form the A-B-A type, the A-B-A-B type, the (A-B-)$_n$-X type (wherein n is an integer of 1 or more, and X represents a reaction residue of a polyfunctional coupling agent such as silicon tetrachloride and tin tetrachloride, or a residue of an initiator such as polyfunctional organic lithium compound), the A-B-A-B-A type, and the like. Among these, the hydrogenated block copolymer having the A-B-A-B type structure is more preferable because such a hydrogenated block copolymer tends to have higher fluidity than that of the A-B-A type hydrogenated block copolymer.

The content of the vinyl aromatic compound bonded in the hydrogenated block copolymer (e) is preferably 15 to 50% by mass, more preferably 25 to 45% by mass, and still more preferably 30 to 45% by mass based on the entire component (e). At an amount of the vinyl aromatic compound of 15% by mass or more, mechanical strength tends to be improved. At an amount of 50% by mass or less, heat resistance and mechanical strength tend to be well balanced.

To further mention each of the block structures, the polymer block A mainly containing a vinyl aromatic compound has a structure of a homopolymer block of a vinyl aromatic compound, or a copolymer block of a vinyl aromatic compound and a conjugated diene in which the copolymer block contains more than 50% by mass and preferably 70% by mass or more of the vinyl aromatic compound. The polymer block B mainly containing a conjugated diene has a structure of a homopolymer block of a conjugated diene, or a copolymer block of a conjugated diene and a vinyl aromatic compound in which the copolymer block contains more than 50% by mass and preferably 70% by mass or more of the conjugated diene.

In the structures of the polymer block A mainly containing a vinyl aromatic compound and the polymer block B mainly containing a conjugated diene, the distribution of the vinyl aromatic compound or conjugated diene in the chain in the polymer block may be any combination of random distribution, tapered distribution (the monomer component is increased or decreased along the chain), and distribution partially having a block structure of 100% by mass of the vinyl aromatic compound or a block structure of 100% by mass of the conjugated diene. In the case where two or more polymer blocks A mainly containing a vinyl aromatic compound and two or more polymer blocks B mainly containing a conjugated diene exist, the polymer blocks of the same kind may have the same structure, or have different structures.

To mention the polymer block B mainly containing a conjugated diene, the at least one polymer block B mainly containing a conjugated diene in the hydrogenated block copolymer (e) used in the present embodiment may be a single polymer block of a conjugated diene whose amount of the 1,2-vinyl bond before hydrogenation is 25 to 70%, or may be a polymer block B mainly containing a conjugated diene comprising at least one polymer block B1 mainly containing a conjugated diene whose amount of the 1,2-vinyl bond is 25 to 45% and at least one polymer block B2 mainly containing a conjugated diene whose amount of the 1,2-vinyl bond is more than 45 and less than 70% in combination. The block copolymer having such a block structure is represented by A-B2-B1-A, for example. The block copolymer can be obtained by a known polymerization method in which the amount of the 1,2-vinyl bond is controlled based on a feed sequence of monomer units adjusted. The bonding form of the conjugated diene before hydrogenation can be known by an infrared spectrophotometer, NMR, or the like.

In the microstructure (bonding form of the conjugated diene compound) of the polymer block B in the component (e), the total amount of the amount of the 1,2-vinyl bond and the amount of the 3,4-vinyl bond (hereinafter, referred to as the "total amount of the vinyl bonds" in some cases) is 25 to 70% by mass, preferably 30 to 60% by mass, and more preferably 40 to 55% by mass based on the entire conjugated diene compound in the component (e).

The aliphatic double bond of the polymer block B mainly containing a conjugated diene in the block copolymer can be hydrogenated. The hydrogenated block copolymer (hydrogenated product of the styrene-butadiene block copolymer) can be used as the component (e). The hydrogenation rate of the aliphatic double bond is preferably 80% or more. The hydrogenation rate can be known by an infrared spectrophotometer, NMR, or the like.

The hydrogenated block copolymer (e) has the structure above. Besides, the number average molecular weight (Mne) of the hydrogenated block copolymer (e) is 100,000 or less, and the number average molecular weight (MneA) of the polymer block A mainly containing a vinyl aromatic compound is 8,000 or more.

The number average molecular weight (Mne) of the hydrogenated block copolymer can be measured using a gel permeation chromatography System 21 made by Showa Denko K.K. (column: one K-G made by Showa Denko K.K., one K-800RL, and one K-800R connected in this order in series, column temperature: 40° C., solvent: chloroform, flow rate of the solvent: 10 ml/min, sample concentration: 1 g/L chloroform solution of the hydrogenated block copolymer) by creating a calibration curve using standard polystyrenes (molecular weights of the standard polystyrenes are 3650000, 2170000, 1090000, 681000, 204000, 52000, 30200, 13800, 3360, 1300, and 550). The wavelength of the UV (ultraviolet light) in the detecting unit is set at 254 nm for both the standard polystyrenes and the hydrogenated block copolymer, and the measurement is performed.

In the case of the A-B-A type structure, the number average molecular weight (MneA) of the polymer block A mainly containing a vinyl aromatic compound in the hydrogenated block copolymer (e) can be determined by the calculation expression: (MneA)=(Mne)×proportion of the amount of bonded vinyl aromatic compound÷2; on the premise that based on the number average molecular weight (Mne) of the hydrogenated block copolymer above, the molecular weight distribution of the hydrogenated block copolymer is 1, and two polymer blocks A mainly containing a vinyl aromatic compound having the same molecular weight exist. Similarly, in the case of the A-B-A-B-A type hydrogenated block copolymer (e), the number average molecular weight (MneA) can be determined by the calculation expression: (MneA)=(Mne)×proportion of the amount of bonded vinyl aromatic compound÷3. In the case where the sequence of the block structure A and the block structure B is clear at a stage of synthesizing the vinyl aromatic compound-conjugated diene block copolymer, without depending on the calculation expression above, the number average molecular weight (MneA) may be calculated based on the measured number average molecular weight (Mne) of the hydrogenated block copolymer from the proportion of the block structure A.

The hydrogenated block copolymer as the component (e) may be obtained by any production method as long as the hydrogenated block copolymer (d) has the structure above. Examples of the known production method include methods described in Japanese Patent Laid-Open Nos. 47-11486, 49-66743, 50-75651, 54-126255, 56-10542, 56-62847, 56-100840, and 2004-269665, British Patent No. 1130770, U.S. Pat. Nos. 3,281,383 and 3,639,517, British Patent No. 1020720, and U.S. Pat. Nos. 3,333,024 and 4,501,857.

The hydrogenated block copolymer as the component (e) may be the hydrogenated block copolymer above, or a modified (0.01 to 10% by mass of α,β-unsaturated carboxylic acid or a derivative thereof is grafted or added) hydrogenated block copolymer obtained by reacting the hydrogenated block copolymer with the α,β-unsaturated carboxylic acid or a derivative thereof (an ester compound and an acid anhydride compound such as maleic anhydride) in the presence of or in the absence of a radical generator in a molten state, a solution state, or a slurry state under a temperature of 80 to 350° C. Further, the hydrogenated block copolymer as the component (e) may be a mixture of the hydrogenated block copolymer above and the modified hydrogenated block copolymer in any proportion.

The blending proportion of the hydrogenated block copolymer (d) and/or the hydrogenated block copolymer (e) usable in combination with the hydrogenated block copolymer (b) is preferably (b)/(d)=1 to 99% by mass/99 to 1% by mass, (b)/(e)=1 to 99% by mass/99 to 1% by mass, and (b)/(d)/(e)=1 to 98% by mass/98 to 1% by mass/1 to 98% by mass. Further, from the viewpoint of obtaining a polymer alloy in which the polyphenylene ether (a) having 5 to 20 mass of the component having a molecular weight of 50,000 or more and 12 to 30% by mass of the component having a molecular weight of 8,000 or less exists in a thermally stable emulsifying and dispersion state in the polypropylene matrix (c), the proportion of the hydrogenated block copolymer (b) contained in 100% by mass of the total amount of the hydrogenated block copolymers (b), (d), and (e) is preferably 3% by mass or more, and more preferably 5% by mass or more.

The total amount of the components (b), (d), and (e) based on the entire components (a) to (e) is preferably 20% by mass or less, more preferably 18% by mass or less, and still more preferably 15% by mass or less.

Further, the relationship of the mass ratio of the component (a) to the component (b) is preferably (a)<(b) from the viewpoint of processability.

[Component (f)]

The resin composition according to the present embodiment may further contain a filler (f). The content of the filler (f) is preferably 2 to 60% by mass, more preferably 3 to 50% by mass, and still more preferably 5 to 45% by mass based on the total amount of the resin composition. The filler used as the component (f) is a component for giving many functions to the resin composition comprising the components (a) to (c), and when necessary the components (d) and (e). For example, the filler can be selected according to the purpose such as giving of rigidity, heat resistance, thermal conductivity, or conductivity, and improvement in the molding shrinkage rate or a coefficient of linear expansion.

As an inorganic filler as the component (f), for example, at least one selected from the group consisting of inorganic salts, glass fibers (glass long fibers, chopped strand glass fibers), celluloses, glass flakes, glass beads, carbon long fibers, chopped strand carbon fibers, whisker, mica, clay, talc, kaolin, magnesium hydroxide, magnesium sulfate and fibers thereof, silica, carbon black, titanium oxide, calcium carbonate, fly ash (coal ash), potassium titanate, wollastonite, thermal conductive substances (such as graphite, aluminum nitride, boron nitride, alumina, beryllium oxide, silicon dioxide, magnesium oxide, aluminum nitrate, and barium sulfate), conductive metal fibers, conductive metal flakes, carbon black having conductivity, carbon fibers having conductivity, and carbon nanotubes can be selected and used. Further, these fillers may be fillers treated with a surface treatment agent such as silane coupling agents, titanate coupling agents, aliphatic carboxylic acids, and aliphatic metal salts, fillers organically modified with an ammonium salt or the like by an intercalation method, and fillers treated using a resin such as urethane resins and epoxy resins as a binder.

Further, the resin composition according to the present embodiment may contain a softening agent for a non-aromatic rubber. The softening agent for a non-aromatic rubber is a component blended for turning a resin composition into a soft rubber composition. A non-aromatic mineral oil or a liquid or low molecular weight synthesized softening agent is suitable. Among these, a mineral oil-based softening agent for a rubber which is called process oil or extender oil and is usually used for improvement in softening of rubber, increase in the volume, and improvement in processability is a mixture of an aromatic ring, a naphthene ring, and a paraffin chain in combination. If carbon atoms in the paraffin chain are 50% or more of the total carbon atoms, this is called a paraffin-based softening agent. If carbon atoms in the naphthene ring are 30 to 45% of the total carbon atoms, this is called a naphthene-based softening agent. If carbon atoms in the aromatic ring are more than 30% of the total carbon atoms, this is called an aromatic-based softening agent. The mineral oil-based softening agent for a rubber is preferably the naphthene-based softening agent and the paraffin-based softening agent in the classification above. The aromatic-based softening agent in which carbon atoms in the aromatic ring are 30% or more of the total carbon atoms is not preferable from the viewpoint of dispersibility and solubility. These non-aromatic softening agents for a rubber have the following properties: a kinematic viscosity at 37.8° C. is 20 to 500 cst, the pour point is −10 to −15° C., and the flash point is 170 to 300° C. As the synthesized softening agent, polybutene, low molecular weight polybutadiene, and the like can be used. However, the mineral oil-based softening agent for a rubber above attains better results. The amount of the non-aromatic softening agent for a rubber blended is 10 to 300 parts by mass, and preferably 20 to 280 parts by mass based on 100 parts by mass of the component (b). At an amount of the softening agent blended of more than 300 parts by mass, the softening agent easily bleeds out. This may cause tackiness in a final product, and reduce mechanical properties. Meanwhile, at an amount of the softening agent blended of less than 10 parts by mass, hardness tends to be increased and flexibility tends to be reduced. Further, the case is not preferable for economical reasons.

The resin composition according to the present embodiment may contain an organic stabilizer. The content of the organic stabilizer is preferably 0.1 to 2.0% by mass, more preferably 0.2 to 1.8% by mass, and still more preferably 0.3 to 1.5% by mass wherein the total amount of the resin composition is 100% by mass.

The organic stabilizer preferably contains at least a hindered phenol-based stabilizer. If the hindered phenol-based stabilizer is contained, a heat stabilizer demonstrating the effect not only during processing but also for a long time can be obtained.

In the case where the organic stabilizer contains at least the hindered phenol-based stabilizer, the content of the hindered phenol-based stabilizer in the organic stabilizer is preferably 40 to 100% by mass, more preferably 50 to 90% by mass, and still more preferably 60 to 80% by mass wherein the total amount of the organic stabilizer is 100% by mass.

The kind of the compound usable as the hindered phenol-based stabilizer is not particularly limited. Specifically, examples of the compound include triethyleneglycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis-(n-octylthio)-6-(4-hydroxy-3,5-di-t-butylanilino)-1,3,5-triazine, pentaerythritoltetrakis[3-(3,5-di-t-butyl-4-hydroxyphenyl)propionate], octadecyl-3-(3,5-di-t-butyl-4-hydroxyphenyl)propionate, N,N'-hexane-1,6-diylbis[3-(3,5-di-t-butyl-4-hydroxyphenyl)propionamide], 3,5-di-t-butyl-4-hydroxy-benzylphosphonate-diethylester, 1,3,5-trimethyl-2,4,6-tris(3,5-di-t-butyl-4-hydroxybenzyl)benzene, tris-(3,5-di-t-butyl-4-hydroxybenzyl)-isocyanurate, N,N'-bis[3-(3,5-di-t-butyl-4-hydroxyphenyl)propionyl] hydrazinedibutylhydroxytoluene, 4,4'-butylidenebis-(6-t-butyl-3-methylphenol), 2,2'-methylenebis-(4-methyl-6-t-butylphenol), 1,3,5-tris(3',5'-di-t-butyl-4'-hydroxybenzyl)-1,3,5-triazine-2,4,6(1H,3H,5H)-trione, 1,1,3-tris(2-methyl-4-hydroxy-5-t-butylphenyl)butane, 4,4'-butylidenebis(3-methyl-6-t-butylphenol), n-octadecyl-3-(3',5'-di-t-butyl-4'-hydroxyphenyl)propionate, tetrakis[methylene-3-(3',5'-di-t-butyl-4-hydroxyphenyl)propionate]methane, 3,9-bis[2-[3-(3-t-butyl-4-hydroxy-5-methylphenyl)propionyloxy]-1,1-dimethylethyl]-2,4,8,10-tetraoxaspiro[5,5]undecane.

These organic stabilizers may be used singly or in combinations of two or more.

Examples of other component that can be blended with the resin composition according to the present embodiment can include additives such as a stabilizer, a mold release agent, a processing aid, a flame retardant, a drip preventing agent, a nucleating agent, a UV blocker, dyes, pigments, an antioxidant, an antistatic agent, and a foaming agent. These additives can be used as long as the additives are known in the technical field. The lower limit value of the blending amount is preferably 0.1 parts by mass or more, more preferably 0.2 parts by mass or more, and still more preferably 0.3 parts by mass or more based on 100 parts by mass of the total resin composition. The upper limit is preferably 10 parts by mass or less, more preferably 5 parts by mass or less, and still more preferably 3 parts by mass or less. In the case of the flame retardant, the upper limit value of the blending amount is preferably 100 parts by mass or less, more preferably 70 parts by mass or less, and still more preferably 50 parts by mass or less based on 100 parts by mass of the total resin mixture. As the flame retardant, at least one selected from the group consisting of organic phosphoric acid ester compounds, phosphinic acid metal salts, magnesium hydroxide, ammonium polyphosphate flame retardants, melamine flame retardants, triazine flame retardants, aromatic halogen flame retardants, silicone flame retardants, and fluorine polymers can be selected and used.

The resin composition according to the present embodiment can be produced by various methods using the components above. Examples of the method include methods for heating and melt kneading the components using a single screw extruder, a twin screw extruder, a roll, a kneader, a Brabender Plastograph, a Banbury mixer, or the like. Among these, the melt kneading method using a twin screw extruder is preferable. At this time, the melting temperature is not particularly limited. Usually, the melting temperature can be arbitrarily selected from the range of 150 to 350° C.

The pellet according to the present embodiment is formed from the resin composition above.

A particularly preferable embodiment of the method for easily obtaining the resin composition according to the present embodiment (and a pellet thereof) will be described below.

(1) The melt kneading machine for melt kneading the components above is a multi screw extruder having two or more screws in which a kneading block can be incorporated into any position of the screw. In the multi screw extruder, the total kneading block portion of the screw to be used is incorporated at substantially $(L/D) \geq 1.5$, and preferably $(L/D) \geq 5$ [wherein L represents the total length of the kneading block, and D represents the largest outer diameter of the kneading block], and $(\pi \cdot D \cdot N/h) \geq 50$ [wherein $\pi = 3.14$, D=screw outer diameter corresponding to the metering zone, N=the number of rotation of the screw (turns/sec), h=groove depth in the metering zone] is satisfied.

(2) These extruders have a first raw material feeding port upstream of the flow direction of the raw materials and at least a second raw material feeding port downstream of the first raw material feeding port. When necessary, one or more raw material feeding ports may be provided downstream of the second raw material feeding port. When necessary, a vacuum vent may be provided between these raw material feeding ports. The method of feeding raw materials fundamental to the method of producing a resin composition is an extrusion method in which the total amount of the polyphenylene ether (a) or the total amount of the polyphenylene ether (a) and part of the polypropylene as the component (c) whose amount does not exceed 50% of the total amount of the polypropylene resin (c), and the total amount of the hydrogenated block copolymer as the component (b) are fed from the first raw material feeding port; the total amount of the polypropylene resin (c) or the remaining polypropylene as the component (c) of the polypropylene distributed to the first raw material feeding port is fed from the second raw material feeding port. The raw materials are melt kneaded under the conditions of an extruder barrel setting temperature of usually 200 to 370° C., and preferably 250 to 320° C., and a number of rotation of the screw of 100 to 1200 rpm, and preferably 200 to 500 rpm. Thereby, a pellet is produced.

(3) The total amounts of the hydrogenated block copolymers as the components (d) and (e) can be fed to the first raw material feeding port, or the hydrogenated block copolymers as the components (d) and (e) each can be divided in any proportion and fed to the first raw material feeding port and to the second raw material feeding port, respectively.

(4) In feeding of the filler as the component (f), a method is preferably used in which basically, the filler is fed from a third raw material feeding port and melt kneaded under a state where all the resin components (a) to (e) are melt kneaded. In the case where a transport ability in the side feed extruder for feeding to the extruder is reduced, which tends to occur when the filler is fine powder, melt kneading is performed by an extrusion method in which the component (f) is fed from the second raw material feeding port together with the total amount of the polypropylene (c) or the remaining polypropylene (c) of the polypropylene (c) distributed to the first raw material feeding port.

(5) The additives such as a stabilizer, a mold release agent, a processing aid, a flame retardant, a drip preventing agent, a nucleating agent, a UV blocker, dyes, pigments, an antioxidant, an antistatic agent, and a foaming agent may be fed from any of the first raw material feeding port and the second raw material feeding port together with the other components. In the case of a liquid additive, melt kneading is performed by an extrusion method in which using a liquid adding jig, the liquid additive is press fed to a press zone provided in the extruder with a plunger pump or a gear pump.

The method of producing a thermoplastic resin composition according to the present embodiment comprises the step of melt kneading the pellet of the resin composition obtained by the method above and a thermoplastic resin.

As the blending proportion of the thermoplastic resin to the pellet, preferably 10 to 1000 parts by mass of the thermoplastic resin is blended based on 100 parts by mass of the pellet.

Examples of the thermoplastic resin include at least one or more selected from the group consisting of vinyl aromatic compound polymers, vinyl aromatic compound copolymers, polypropylene-based resin, polyethylene, ethylene-α-olefin copolymers, polyamide 6, polyamide 66, polyamide 66/6, polycarbonate, polyacetal, polyethylene terephthalate, polybutylene terephthalate, polytrimethylene terephthalate, aromatic ring-containing polyamide, aliphatic ring-containing polyamide, polyphenylene sulfide, liquid crystal polymers, polyether ether ketone, polyarylate, polyethersulfone, and polysulfone. Particularly, polypropylene-based resins are preferable.

The thermoplastic resin composition can be produced by various methods. Examples of the method include heating and melt kneading methods using a single screw extruder, a twin screw extruder, a roll, a kneader, a Brabender Plastograph, a Banbury mixer, or the like. Among these, a melt kneading method using a single screw extruder or a twin screw extruder is preferable.

Further, when the thermoplastic resin composition is obtained, the filler component (f) above and other additives may be kneaded. The case of melt kneading using a twin screw extruder and the case of kneading the pellet, the thermoplastic resin, and the filler component will be described as examples. Examples of the method include:

(1) a method of feeding the pellet, the thermoplastic resin, and the filler (f) from the first raw material feeding port, (2) a method of feeding the pellet from the first raw material feeding port and feeding the thermoplastic resin and the filler component (f) from the second raw material feeding port, (3) a method of feeding the pellet from the first raw material feeding port, feeding the thermoplastic resin from the second raw material feeding port, and feeding the filler component (f) from the third raw material feeding port, and (4) a method of feeding the thermoplastic resin from the first raw material feeding port, feeding the pellet from the second raw material feeding port, and feeding the filler component (f) from the third raw material feeding port.

These methods can be properly selected according to the purpose to widen the processing conditions.

In the case where the pellet is used as a raw material and the polypropylene-based resin is melt kneaded, the method (3) above is preferably used from the viewpoint of lightfastness and preventing die drool.

For example, in the case where the components (a), (b), and (c) are melt kneaded at one stage in batch as well known in the related art, in order to plasticize polyphenylene ether, the setting temperature of a process machine such as an extruder needs to be a temperature higher than 270° C. However, if the pellet comprising the polyphenylene ether (a) and the hydrogenated block copolymer (b) is produced, and used as the raw material, melt kneading (compounding) can be performed at a setting temperature of the process machine of 270° C. or less. From the viewpoint of the lightfastness and suppression in die drool, the setting temperature during the second compounding is preferably 260° C. or less, and more preferably 250° C. or less. At a setting temperature within the range above, production of die drool is significantly suppressed at an interface between the resin extruded from the die of the extruder and the die.

In the method of producing a thermoplastic resin composition according to the present embodiment, the step of melt mixing is preferably performed using an extruder or an injection molding machine.

For example, preferably 10 to 1000 parts by mass of the polypropylene-based resin is dry blended based on 100 parts by mass of the pellet, and the blended materials are injection molded. Thereby, a molded body can be obtained. In this method, the process can be significantly simplified, and a molded body of a resin composition having high lightfastness can be obtained.

Further, preferably 10 to 1000 parts by mass of the polypropylene-based resin is dry blended based on 100 parts by mass of the pellet, and the blended materials are extrusion molded. Thereby, a molded body can be obtained. In this method, the process can be significantly simplified, and a molded body having high lightfastness can be obtained. Further, occurrence of die drool at the interface between the die and the molten resin during extrusion molding can be suppressed.

The molded body according to the present embodiment is obtained by molding the resin composition above.

The molded body obtained by molding the resin composition above by various conventionally known methods such as injection molding, extrusion molding (sheets and films), and hollow molding can be used as a variety of parts. Examples of the variety of parts include automobile exterior and outer plate parts, automobile interior parts, and automobile underhood parts. Specifically, the molded body is suitable for exterior and outer plate parts and underhood parts such as bumpers, fenders, door panels, moldings, emblems, engine hoods, wheel covers, roofs, spoilers, and engine covers; and interior parts such as instrument panels and console box trims. Further, the molded body can also be used as cabinets and chassis for a variety of computers and their peripheral devices, other OA apparatuses, television sets, video apparatuses, a variety of disk players; refrigerators; air conditioners; and liquid crystal projectors, and the like. Further, the molded body using the resin composition can be used as electric wires and cables obtained by coating a metal conductor or an optical fiber; fuel cases for solid methanol batteries; electrolyzers of secondary batteries; water feeding pipes for fuel cells; cooling water tanks; boiler exterior cases; ink-related parts and members in inkjet printers and chassis thereof; molded bodies such as water feeding pipes and joints; and separators for lithium ion batteries obtained by stretching sheets or films.

The molded body according to the present embodiment is preferably at least one selected from the group consisting of (1) to (4) below:
(1) sheets, films, or stretched sheets and films,
(2) automobile exterior and outer plate parts, automobile interior parts, or automobile underhood parts,
(3) electric wires and cables obtained by coating a metal conductor or an optical fiber with the resin composition, and
(4) ink-related parts and members in inkjet printers, or chassis thereof.

EXAMPLES

The present embodiment will be described more in detail using Examples, but the present embodiment will not be limited by these Examples.
(Polyphenylene Ether Powder)
[Number Average Molecular Weight]
The number average molecular weights of the respective components, the amount of the component having a molecular weight of 8,000 or less, and the amount of the component having a molecular weight of 50,000 or more were measured by GPC (mobile phase: chloroform, standard substance: polystyrene).

[Measurement of Color Index (C.I. Heat) of Polyphenylene Ether after Heating]

In Examples and Comparative Examples described later, the polyphenylene ether powder obtained in each of Examples and Comparative Examples was subjected to a heat press treatment (the conditions of 310° C., for 20 minutes, and 10 MPa), and the heat pressed powder was dissolved in chloroform to prepare a polyphenylene ether solution having a concentration of polyphenylene ether of 0.05 g/mL.

The same chloroform as the chloroform for dissolving the polyphenylene ether was added to a quartz cell having a cell length of 1 cm, and irradiated with ultraviolet light having a wavelength of 480 nm to measure the absorbance of pure chloroform. The absorbance was defined as a reference value 0.

Next, the chloroform in the quartz cell was discharged, and the quartz cell was washed, and dried. Subsequently, the chloroform solution of the polyphenylene ether prepared above was added to the quartz cell, and irradiated with the ultraviolet light having a wavelength of 480 nm to measure the absorbance of the chloroform solution.

The absorbance of pure chloroform was subtracted from the obtained absorbance of the polyphenylene ether solution, and the obtained value was divided by the concentration of the polyphenylene ether in the polyphenylene ether solution to obtain the Color Index of the polyphenylene ether (C.I. heat).
[Determination of Amount of Remaining Metal Catalyst]

Using an atomic absorption spectrophotometer (made by SHIMADZU Corporation, AA6650), the concentration of the remaining metal in the polyphenylene ether powder obtained in each of Examples and Comparative Examples described later was measured.

Example 1

While nitrogen gas was blown at a flow rate of 0.5 L/min into a 40 L polymerization tank with a jacket in which a sparger for introducing an oxygen containing gas, a stirring turbine blade, and a baffle were included in the bottom of a polymerization tank, and a reflux cooler was included in a vent gas line in an upper portion of the polymerization tank, 4.02 g of cupric oxide, 29.876 g of a 47% by mass hydrogen bromide aqueous solution, 9.684 g of di-t-butylethylenediamine, 48.88 g of di-n-butylamine, 141.94 g of butyldimethylamine, 19.65 kg of toluene, and 1.12 kg of 2,6-dimethylphenol were placed in the polymerization tank, and stirred until a uniform solution was obtained and the inner temperature of the polymerization tank reached 25° C.

Next, dry air started to be introduced into the polymerization tank at a rate of 32.8 NL/min with the sparger, and polymerization was started. At the same time, a mixed solution comprising 1.0 kg of toluene and 2.0 kg of 2,6-dimethylphenol was added over 30 minutes. The dry air was passed through for 85 minutes to obtain a polymerization mixture. The temperature was controlled such that the inner temperature when the polymerization was completed to be 40° C. The polymerization solution when the polymerization was completed was in a liquid state.

Passing of the dry air was stopped. 2.4 kg of a 2.5% by mass aqueous solution of tetrasodium ethylenediaminetetraacetate (reagent made by DOJINDO LABORATORIES) was added to the polymerization mixture to obtain a polymerization mixture solution. 5 kg of the polymerization mixture solution was placed into a 20 L extraction tank with a jacket including an online viscometer MIVI7000 made by VISCOTECH CO., LTD., and stirred at 70° C. for 120 minutes. Then, the solution viscosity of the polymerization mixture solution cooled to room temperature was 8 cP. Next, toluene was gradually added to the polymerization mixture solution, and addition was continued until the solution viscosity reached approximately 3 cP. Approximately 1.1 kg of toluene was needed. The polymerization mixture solution after the addition was fed to a Laboratory Centrifuge T-1P made by TOMOE Engineering Co., Ltd. at 200 ml/min. An oil phase was separated from an aqueous phase, and recovered. The solution viscosity of the oil phase when the oil phase was separated from the aqueous phase was 3 cp. Methanol was excessively added to the recovered oil phase at room temperature to produce a slurry in which the polyphenylene ether was deposited. Then, the polymerization solution was placed in an extraction tank. The oil phase was separated from the aqueous phase. The operation in which methanol was excessively added to the oil phase to produce a slurry was performed 10 times. Then, the slurry was filtered using a basket-type centrifugal separator (made by TANABE WILLTEC INC., O-15 type). After filtration, an excessive amount of methanol was placed in the basket-type centrifugal separator, and filtered again to obtain a wet polyphenylene ether. The obtained wet polyphenylene ether was kept at 150° C. and 1 mmHg for 1.5 hours to obtain dry polyphenylene ether powder. The physical properties and properties of the obtained polyphenylene ether powder were measured according to the methods above. The results are shown in Table 1.

The same operation as that in the polymerization, filtration, and drying above was repeated twice to obtain approximately 6 kg of the polyphenylene ether powder in total. The polyphenylene ether powder was measured according to the methods above. The remaining metal catalyst in the polyphenylene ether powder after drying was 0.01 ppm, and the Color Index value after heating of the polyphenylene ether (C.I. heat) was 2.2. As a result by GPC measurement, the molecular weight was as follows:
the amount of the component having a molecular weight of 50,000 or more: 12% by mass
the amount of the component having a molecular weight of 8,000 or less: 22% by mass
the number average molecular weight: 11000.

Example 2

The operation was performed in the same manner as in Example 1 except that the time to introduce dry air by the sparger was 95 minutes. Thereby, approximately 6 kg of polyphenylene ether powder was obtained. The solution viscosity of the oil phase when the oil phase was separated from the aqueous phase was 4 cp. The polyphenylene ether powder was measured according to the methods above. The remaining metal catalyst in the polyphenylene ether powder after drying was 0.08 ppm, and the Color Index value after heating of the polyphenylene ether (C.I. heat) was 2.5. As a result by GPC measurement, the molecular weight was as follows:
the amount of the component having a molecular weight of 50,000 or more: 16% by mass
the amount of the component having a molecular weight of 8,000 or less: 15% by mass
the number average molecular weight: 12750.

Comparative Example 1

The operation was performed in the same manner as in Example 1 except that the time to introduce dry air by the sparger was 132 minutes to obtain a polymerization mixture, toluene for controlling the solution viscosity in the extraction tank was not added, and the solution viscosity was approximately 15 cP. Thereby, approximately 6 kg of polyphenylene ether powder was obtained. The solution viscosity of the oil phase when the oil phase was separated from the aqueous phase was 15 cp. The obtained polyphenylene ether powder was measured according to the methods above. The remaining metal catalyst in the polyphenylene ether powder after drying was 0.74 ppm, and the Color Index value after heating of the polyphenylene ether (C.I. heat) was 4.1. As a result by GPC measurement, the molecular weight was as follows:
the amount of the component having a molecular weight of 50,000 or more: 23% by mass
the amount of the component having a molecular weight of 8,000 or less: 10% by mass
the number average molecular weight: 16000.

Comparative Example 2

The operation was performed in the same manner as in Example 1 except that the time to introduce dry air by the sparger was 170 minutes to obtain a polymerization mixture, toluene for controlling the solution viscosity in the extraction tank was not added, and the solution viscosity was approximately 30 cP. Thereby, approximately 6 kg of polyphenylene ether powder was obtained. The polyphenylene ether powder was measured according to the methods above. The remaining metal catalyst in the polyphenylene ether powder after drying was 0.83 ppm, and the Color Index value after heating of the polyphenylene ether (C.I. heat) was 4.2. As a result by GPC measurement, the molecular weight was as follows:
the amount of the component having a molecular weight of 50,000 or more: 43% by mass
the amount of the component having a molecular weight of 8,000 or less: 6% by mass
the number average molecular weight: 21000.

Comparative Example 3

The operation was performed in the same manner as in Example 1 except that the time to introduce dry air by the sparger was 71 minutes to obtain a polymerization mixture, toluene for controlling the solution viscosity in the extraction tank was not added, and the solution viscosity was approximately 3 cP. Thereby, approximately 6 kg of polyphenylene ether powder was obtained. The polyphenylene ether powder was measured according to the methods above. The remaining metal catalyst in the polyphenylene ether powder after drying was 0.07 ppm, and the Color Index value after heating of the polyphenylene ether (C.I. heat) was 7.6. As a result by GPC measurement, the molecular weight was as follows:
the amount of the component having a molecular weight of 50,000 or more: 3% by mass
the amount of the component having a molecular weight of 8,000 or less: 38% by mass
the number average molecular weight: 7000.

Comparative Example 4

The operation was performed in the same manner as in Comparative Example 1 except that 9.28 g of cupric oxide, 69.744 g of a 47% by mass hydrogen bromide aqueous solution, 22.346 g of di-t-butylethylenediamine, 108.2 g of di-n-butylamine, 329.26 g of butyldimethylamine, 16.26 kg of toluene, and 7.20 kg of 2,6-dimethylphenol were placed in the tank, the rate of introducing dry air into the polymerization tank was 75.7 NL/min, and the time to introduce dry air by the sparger was 120 minutes. Thereby, approximately 7 kg of polyphenylene ether powder was obtained.

After the polymerization was completed, the polyphenylene ether powder was visually observed. Then, it was found that the polyphenylene ether powder was partially gel. Accordingly, the solution viscosity was not measured.

The remaining metal catalyst in the polyphenylene ether powder after drying was 2.29 ppm, and the Color Index value after heating of the polyphenylene ether (C.I. heat) was 6.8. As a result by GPC measurement, the molecular weight was as follows:
the amount of the component having a molecular weight of 50,000 or more: 12% by mass
the amount of the component having a molecular weight of 8,000 or less: 35% by mass
the number average molecular weight: 11000.

Comparative Example 5

While nitrogen gas was blown at a flow rate of 500 mL/min into a 1.6 L first polymerization tank with a jacket in which a sparger for introducing an oxygen containing gas, a stirring turbine blade, and a baffle were included in the bottom of the polymerization tank, a reflux cooler was included in a vent gas line in an upper portion of the polymerization tank, and an overflow line to a second polymerization tank was included on a side surface of the polymerization tank, 0.239 g of cupric chloride dihydrate, 1.122 g of 35% hydrochloric acid, 3.531 g of di-n-butylamine, 18.154 g of N,N,N',N'-tetramethylpropanediamine, 445.1 g of xylene, 170.8 g of n-butanol, and 509.5 g of methanol were placed in the first polymerization tank.

Similarly, while nitrogen gas was blown at a flow rate of 1000 mL/min into a 4.0 L second polymerization tank with a jacket in which a sparger for introducing an oxygen containing gas, a stirring turbine blade, and a baffle were included in the bottom of the polymerization tank, a reflux cooler was included in a vent gas line in an upper portion of the polymerization tank, and an overflow line to a washing tank was included in a side surface of the polymerization tank, 1007.8 g of xylene, 378.4 g of n-butanol, and 509.5 g of methanol were placed in the second polymerization tank.

While nitrogen gas was blown from a nitrogen gas inlet at a flow rate of 500 mL/min into a 6.0 L first raw material tank in which a line enabling feeding a solution to the first polymerization tank with a plunger pump, and a stirring turbine blade were included, and a reflux cooler was included in a vent gas line in an upper portion of the tank, 0.642 g of cupric chloride dihydrate, 2.827 g of 35% hydrochloric acid, 9.247 of di-n-butylamine, 24.519 g of N,N,N',N'-tetramethylpropanediamine, 1206.5 g of xylene, 454.5 g of n-butanol, 1362.2 g of methanol, and 920.0 g of 2,6-dimethylphenol were placed in the first raw material tank, and stirred to mix a solution. Thus, a polymerization solution was obtained. The solution prepared in the first raw material tank reduced by feeding the solution to the polymerization tank. Accordingly, the solution comprising the solution composition above was properly additionally added to the first raw material tank.

Next, the polymerization solution was fed from the first raw material tank at a flow rate of 19.42 g/min to the first polymerization tank in which stirring was performed hard. At the same time, oxygen was started to be introduced into the first polymerization tank at a rate of 329.42 mL/min with the sparger. Further, overflow from the first polymerization tank to the second polymerization tank was started, and at the same time, oxygen was introduced into the second polymerization tank at a rate of 32.4 mL/min with the sparger. The polymerization temperature in the first polymerization tank and that in the second polymerization tank were adjusted to keep 40° C. by passing a heating medium through the jacket. The overflow from the second polymerization tank was recovered in a recovery container.

Then, after 40 hours, the overflowed slurry was started to recovered. For 23 hours after the start of recovery, the polymerization was continued, and the polymerization was completed. Approximately 26.8 kg of the slurry of polyphenylene ether was obtained.

A quarter of the amount (6.7 kg) of the slurry of polyphenylene ether thus obtained was placed in a 10 L tank with a jacket in which a stirring turbine blade and a baffle were included, and a reflux cooler was included in a vent gas line in an upper portion of the tank. 70 g of a 10% by mass aqueous solution of ethylenediaminetetraacetic acid tripotassium salt (reagent made by DOJINDO LABORATORIES) was added, and the slurry was heated to 50° C.

Next, hydroquinone (reagent made by Wako Pure Chemical Industries, Ltd.) was added little by little, and the temperature of the slurry polyphenylene ether was kept at 50° C. until the slurry polyphenylene ether became white. The white slurry polyphenylene ether was filtered. Methanol was added to the polyphenylene ether obtained by filtration to perform a washing treatment. Polyphenylene ether powder was obtained.

The remaining slurry of polyphenylene ether was treated in the same manner to obtain approximately 6 kg of polyphenylene ether powder in total. The obtained polyphenylene ether powder was measured according to the methods above. The remaining metal catalyst in the polyphenylene ether powder after drying was 1.1 ppm, and the Color Index value after heating of the polyphenylene ether (C.I. heat) was 5.2. As a result of GPC measurement above, the molecular weight was as follows:
the amount of the component having a molecular weight of 50,000 or more: 8% by mass,
the amount of the component having a molecular weight of 8,000 or less: 8% by mass, and
the number average molecular weight: 12500.

In Examples 1 and 2, the obtained polyphenylene ether has the component having a molecular weight of 50,000 or more in the range of 5 to 20% by mass, and the component having a molecular weight of 8,000 or less in the range of 12 to 30% by mass. In the polyphenylene ethers having the low molecular weight component in such a range, which were obtained in Examples 1 and 2, the polymerization solution when the polymerization was completed had a low viscosity. For this reason, the metal catalyst could be efficiently removed after the polymerization. As a result, the polyphenylene ether after heating had an extremely good color tone.

The polyphenylene ethers obtained in Comparative Examples 1 and 2 had 23% by mass or more of the component having a molecular weight of 50,000 or more, in which the proportion of the component was higher. Thus, the polyphenylene ethers obtained in Comparative Examples 1 and 2 were a type containing a large amount of the high molecular weight component. For this reason, the polymerization solution when the polymerization was completed had a higher viscosity, and the metal catalyst could not be sufficiently removed after the polymerization.

The polyphenylene ether obtained in Comparative Example 3 had 38% by mass of the component having a molecular weight of 8,000 or less, in which the proportion of the component was higher. Thus, the polyphenylene ether obtained in Comparative Example 3 was a type containing an extremely large amount of the low molecular weight component. For this reason, the polymerization solution when the polymerization was completed had a low viscosity, and the metal catalyst could be efficiently removed after the polymerization. However, because the polyphenylene ether obtained in Comparative Example 3 was the type containing an extremely large amount of the low molecular weight component, the polyphenylene ether after heating had an unsatisfactory color tone.

The polyphenylene ether obtained in Comparative Example 4 had a high concentration of the monomer, and was partially gelled. For this reason, the metal catalyst could not be efficiently removed.

In the polyphenylene ether obtained in Comparative Example 5, the metal catalyst could not be efficiently removed, and the polyphenylene ether after heating had an unsatisfactory color tone.

It turned out that as the polyphenylene ether obtained in Examples 1 and 2 above, in the polyphenylene ether having a molecular weight in the specific range, the metal catalyst was able to be efficiently removed after the polymerization was completed, and the polyphenylene ether demonstrated a good color tone after heating.

<Resin Composition Comprising Polyphenylene Ether and Hydrogenated Block Copolymer>

The physical properties of the resin composition were measured as follows.

[Number Average Molecular Weight]

The number average molecular weights of the components, the amount of the component having a molecular weight of 8,000 or less, and the amount of the component having a molecular weight of 50,000 or more were measured by GPC (mobile phase: chloroform, standard substance: polystyrene).

[Measurement of Amount of Bonded Styrene]

The amount of bonded styrene was measured by NMR.

[Measurement of Hydrogenation Rate]

The hydrogenation rate was measured by NMR.

[Measurement of Total Amount of Vinyl Bonds]

The total amount of the vinyl bonds was measured using an infrared spectrophotometer.

[Production of Components in Resin Composition]

Production of Polyphenylene Ether (a)

(a-1): While nitrogen gas was blown at a flow rate of 0.5 L/min into a 40 L polymerization tank with a jacket in which a sparger for introducing an oxygen containing gas, a stirring turbine blade, and a baffle were included in the bottom of a polymerization tank, and a reflux cooler was included in a vent gas line in an upper portion of the polymerization tank, 4.02 g of cupric oxide, 29.876 g of a 47% by mass hydrogen bromide aqueous solution, 9.684 g of di-t-butylethylenediamine, 48.88 g of di-n-butylamine, 141.94 g of butyldimethylamine, 19.65 kg of toluene, and 1.12 kg of 2,6-dimethylphenol were placed in the polymerization tank, and stirred until a uniform solution was obtained and the inner temperature of the polymerization tank reached 25° C.

Next, dry air started to be introduced into the polymerization tank at a rate of 32.8 NL/min with the sparger, and polymerization was started. At the same time, a mixed solution comprising 1.0 kg of toluene and 2.0 kg of 2,6-dimethylphenol was added over 30 minutes. The dry air was passed through for 85 minutes to obtain a polymerization mixture. The temperature was controlled such that the inner temperature when the polymerization was completed as 40° C. The polyphenylene ether solution when the polymerization was completed was in a liquid state.

Passing of the dry air was stopped. 2.4 kg of a 2.5% by mass aqueous solution of tetrasodium ethylenediaminetetraacetate (reagent made by DOJINDO LABORATORIES) was added to the polymerization mixture to obtain a polymerization mixture solution. 5 kg of the polymerization mixture solution was placed into a 20 L extraction tank with a jacket including an online viscometer MIVI7000 made by VISCOTECH CO., LTD., and stirred at 70° C. for 120 minutes. Then, the solution viscosity of the polymerization mixture solution cooled to room temperature was 8 cP. Next, toluene was gradually added to the polymerization mixture solution, and addition was continued until the solution viscosity reached approximately 3 cP. Approximately 1.1 kg of toluene was needed. The polymerization mixture solution after addition was fed to a Laboratory Centrifuge T-1P made by TOMOE ENGINEERING CO., LTD. at 200 ml/min. An oil phase was separated from an aqueous phase, and recovered. The solution viscosity of the oil phase when the oil phase was separated from the aqueous phase was 3 cp. Methanol was excessively added to the recovered oil phase at room temperature to produce a slurry in which the polyphenylene ether was deposited. Then, the polymerization solution was placed in an extraction tank. The oil phase was separated from the aqueous phase. The operation in which methanol was excessively added to the oil phase to produce a slurry was performed 10 times. Then, the slurry was filtered using a basket-type centrifugal separator (made by TANABE WILLTEC INC., 0-15 type). After filtration, an excessive amount of methanol was placed in the basket-type centrifugal separator, and filtered again to obtain a wet polyphenylene ether. The obtained wet polyphenylene ether was kept at 150° C. and 1 mmHg for 1.5 hours to obtain dry polyphenylene ether powder. The physical properties and properties of the obtained polyphenylene ether powder were measured according to the methods above.

The same operation as that in the polymerization, filtration, and drying above was repeated twice to obtain approximately 6 kg of the polyphenylene ether powder in total. The polyphenylene ether powder was measured according to the methods above. The remaining metal catalyst in the polyphenylene ether powder after drying was 0.01 ppm, and the Color Index value after heating of the polyphenylene ether (C.I. heat) was 2.2. As a result by GPC measurement, the molecular weight was as follows:

the amount of the component having a molecular weight of 50,000 or more: 12% by mass the amount of the component having a molecular weight of 8,000 or less: 22% by mass the number average molecular weight: 11000.

(a-2): While nitrogen gas was blown at a flow rate of 500 ml/min into a 10 L polymerization tank with a jacket in which a sparger for introducing an oxygen containing gas, a stirring turbine blade, and a baffle were included in the bottom of the polymerization tank, and a reflux cooler was included in a vent gas line in an upper portion of the polymerization tank, 1.1164 g of cupric chloride dihydrate, 4.9172 g of 35% by mass hydrochloric acid, 42.642 g of N,N,N',N'-tetramethylpropanediamine, 16.082 g of di-n-butylamine, 2534.1 g of xylene, 2534.1 g of n-butanol, 1267.1 g of methanol, and 1600.0 g of 2,6-dimethylphenol were placed in the polymerization tank, and stirred until a uniform solution was obtained and the inner temperature of the reactor reached 30° C.

Next, the oxygen containing gas was started to be introduced with the sparger at a rate of 1000 Nml/min into the polymerization tank in which stirring was performed hard. The oxygen containing gas was passed through for 420 minutes to obtain a polymerization mixture. The temperature was controlled such that the inner temperature of the reactor was 40° C. After 135 minutes from the start of feeding of oxygen gas, polyphenylene ether was deposited in a slurry-like form.

The form of the polymerization solution when the polymerization was completed was a precipitated polymerization solution.

Passing the oxygen containing gas was stopped, and 12.0 g of a 50% by mass aqueous solution of ethylenediaminetetraacetic acid tripotassium salt (reagent made by DOJINDO LABORATORIES) was added to the polymerization mixture. Then, the polymerization mixture was stirred for 60 minutes. Next, hydroquinone (reagent made by Wako Pure Chemical Industries, Ltd.) was added little by little, and continuously stirred until the slurry polyphenylene ether became white. The temperature was controlled such that the inner temperature of the reactor was 50° C. The white slurry polyphenylene ether was filtered. Methanol was added to the polyphenylene ether obtained by filtration to perform a washing treatment. Then, the polyphenylene ether was kept at 150° C. and 1 mmHg for 1.5 hours to obtain dry polyphenylene ether powder.

The same operation as the polymerization, filtration, and drying above was repeated 4 times to obtain approximately 6 kg of polyphenylene ether powder in total. Polyphenylene ether powder (a-2) was obtained. As a result of GPC measurement, the molecular weight of (a-2) was as follows:
the amount of the component having a molecular weight of 50,000 or more: 6% by mass,
the amount of the component having a molecular weight of 8,000 or less: 12% by mass, and
the number average molecular weight: 11500.

The remaining metal catalyst in the polyphenylene ether powder after drying was 0.9 ppm.

(a-3): The operation was performed in the same manner as in the case of (a-2) above except that the amount of xylene to be placed in the polymerization tank was 4117.9 g, the amount of n-butanol was 950.3 g, and the amount of methanol was 1267.1 g. Thereby, approximately 6 kg of polyphenylene ether powder was obtained. Polyphenylene ether powder (a-3) was obtained. As a result of GPC measurement, the molecular weight of (a-3) was as follows:
the amount of the component having a molecular weight of 50,000 or more: 42% by mass,
the amount of the component having a molecular weight of 8,000 or less: 4% by mass, and
the number average molecular weight: 24600.

The remaining metal catalyst in the polyphenylene ether powder after drying was 0.7 ppm.

(a-4): While nitrogen gas was blown at a flow rate of 500 mL/min into a 1.6 L first polymerization tank with a jacket in which a sparger for introducing an oxygen containing gas, a stirring turbine blade, and a baffle were included in the bottom of the polymerization tank, a reflux cooler was included in a vent gas line in an upper portion of the polymerization tank, and an overflow line to the second polymerization tank was included in a side surface of the polymerization tank, 0.239 g of cupric chloride dihydrate, 1.122 g of 35% hydrochloric acid, 3.531 g of di-n-butylamine, 18.154 g of N,N,N',N'-tetramethylpropanediamine, 445.1 g of xylene, 170.8 g of n-butanol, and 509.5 g of methanol were placed in the first polymerization tank.

Similarly, while nitrogen gas was blown at a flow rate of 1000 mL/min into a 4.0 L second polymerization tank with a jacket in which a sparger for introducing an oxygen containing gas, a stirring turbine blade, and a baffle were included in the bottom of the polymerization tank, a reflux cooler was included in a vent gas line in an upper portion of the polymerization tank, and an overflow line to a washing tank was included in a side surface of the polymerization tank, 1007.8 g of xylene, 378.4 g of n-butanol, and 509.5 g of methanol were placed in the second polymerization tank.

While nitrogen gas was blown from a nitrogen gas inlet at a flow rate of 500 mL/min into a 6.0 L first raw material tank in which a line enabling feeding a solution to the first polymerization tank with a plunger pump, and a stirring turbine blade were included, and a reflux cooler was included in a vent gas line in an upper portion of the tank, 0.642 g of cupric chloride dihydrate, 2.827 g of 35% hydrochloric acid, 9.247 of di-n-butylamine, 24.519 g of N,N,N',N'-tetramethylpropanediamine, 1206.5 g of xylene, 454.5 g of n-butanol, 1362.2 g of methanol, and 920.0 g of 2,6-dimethylphenol were placed in the raw material tank, and stirred to mix a solution. Thereby, a polymerization solution was obtained. The solution prepared in the first raw material tank reduced by feeding the solution to the polymerization tank. Accordingly, the solution comprising the solution composition above was properly additionally added to the first raw material tank.

Next, the polymerization solution was fed from the first raw material tank at a flow rate of 19.42 g/min to the first polymerization tank in which stirring was performed hard. At the same time, an oxygen containing gas was started to be introduced into the first polymerization tank at a rate of 329.42 mL/min with the sparger. Further, overflow from the first polymerization tank to the second polymerization tank was started, and at the same time, the oxygen containing gas was introduced into the second polymerization tank with the sparger at a rate of 32.4 mL/min. The polymerization temperature in the first polymerization tank and that in the second polymerization tank were adjusted to be kept at 40° C. by passing a heating medium through the jacket. The overflow from the second polymerization tank was recovered in a recovery container.

Then, after 40 hours, the overflowed slurry was started to recovered. For 23 hours after the start of recovery, the polymerization was continued, and the polymerization was completed. Approximately 26.8 kg of the slurry of polyphenylene ether was obtained.

A quarter of the amount of the slurry of polyphenylene ether thus obtained (6.7 kg) was placed in a 10 L tank with a jacket in which a stirring turbine blade and a baffle were included, and a reflux cooler was included in a vent gas line in an upper portion of the tank. 70 g of a 10% aqueous solution of ethylenediaminetetraacetic acid tripotassium salt (reagent made by DOJINDO LABORATORIES) was added, and the slurry was heated to 50° C.

Next, hydroquinone (reagent made by Wako Pure Chemical Industries, Ltd.) was added little by little, and the temperature of the slurry polyphenylene ether was kept at 50° C. until the slurry polyphenylene ether became white. The white slurry polyphenylene ether was filtered. Methanol was added to the polyphenylene ether obtained by filtration to perform a washing treatment. Polyphenylene ether powder was obtained.

The remaining slurry of polyphenylene ether was treated in the same manner to obtain approximately 6 kg of polyphenylene ether powder in total. The obtained polyphenylene ether powder was (a-4). As a result of GPC measurement, the molecular weight of (a-4) was as follows:
the amount of the component having a molecular weight of 50,000 or more: 8% by mass,
the amount of the component having a molecular weight of 8,000 or less: 8% by mass, and
the number average molecular weight: 12500.

The remaining metal catalyst in the polyphenylene ether powder after drying was 0.9 ppm.

Production of Hydrogenated Block Copolymer (b)

Using n-butyllithium as an initiator and tetrahydrofuran as an adjuster for the amount of the 1,2 bond, styrene and butadiene were subjected to anion block copolymerization in a cyclohexane solvent. Thereby, a styrene-butadiene-based block copolymer was polymerized. Next, the obtained styrene-butadiene-based block copolymer was hydrogenated at a pressure of hydrogen of 5 kg/cm$^2$ and a temperature of 50° C. using bis($\eta^5$-cyclopentadienyl) titaniumdichloride and n-butyllithium as hydrogenation catalysts. The polymer structure was controlled by changing the amount of the monomer to be prepared and order. The molecular weight was controlled by changing the amount of a catalyst. The amount of the 1,2 bond was controlled by changing the amount of the adjuster for the amount of the 1,2 bond and the polymerization temperature. The hydrogenation rate was controlled by changing the hydrogenation time.

(b-1) A hydrogenated block copolymer having the B-A-B-A type structure of hydrogenated polybutadiene-polystyrene (1)-hydrogenated polybutadiene-polystyrene (2) was synthesized according to the method above. A hydrogenated block copolymer (b-1) was obtained. The physical properties of (b-1) were as follows: the amount of bonded styrene: 32%, the total amount of amount of 1,2-vinyl bond and amount of 3,4-vinyl bond in polybutadiene (total amount of vinyl bonds): 36%, the number average molecular weight of the hydrogenated block copolymer: 65000, the number average molecular weight of polystyrene (1): 9800, the number average molecular weight of polystyrene (2): 9800, and hydrogenation rate of polybutadiene portion: 99.9%.

(b-2) A hydrogenated block copolymer having the B-A-B-A type structure of hydrogenated polybutadiene-polystyrene (1)-hydrogenated polybutadiene-polystyrene (2) was synthesized according to the method above. A hydrogenated block copolymer (b-2) was obtained. The physical properties of (b-2) were as follows:

amount of bonded styrene: 45%, total amount of amount of 1,2-vinyl bond and amount of 3,4-vinyl bond in polybutadiene (total amount of vinyl bonds): 36%, the number average molecular weight of the hydrogenated block copolymer: 49000, the number average molecular weight of polystyrene (1): 10300, the number average molecular weight of polystyrene (2): 10300, and hydrogenation rate of polybutadiene portion: 99.9%.

(b-3) A hydrogenated block copolymer having the B-A-B-A type structure of hydrogenated polybutadiene-polystyrene (1)-hydrogenated polybutadiene-polystyrene (2) was synthesized according to the method above. A hydrogenated block copolymer (b-3) was obtained. The physical properties of (b-3) were as follows:

amount of bonded styrene: 40%, total amount of amount of 1,2-vinyl bond and amount of 3,4-vinyl bond in polybutadiene (total amount of vinyl bonds): 35%, the number average molecular weight of the hydrogenated block copolymer: 60000, the number average molecular weight of polystyrene (1): 12000, the number average molecular weight of polystyrene (2): 12000, and hydrogenation rate of polybutadiene portion: 99.9%.

(b-4) A hydrogenated block copolymer having the B-A-B-A type structure of hydrogenated polybutadiene-polystyrene (1)-hydrogenated polybutadiene-polystyrene (2) was synthesized according to the method above. A hydrogenated block copolymer (b-4) was obtained. The physical properties of (b-4) were as follows:

amount of bonded styrene: 43%, total amount of amount of 1,2-vinyl bond and amount of 3,4-vinyl bond in polybutadiene (total amount of vinyl bonds): 75%, the number average molecular weight of the hydrogenated block copolymer: 97000, the number average molecular weight of polystyrene (1): 22000, the number average molecular weight of polystyrene (2): 20000, and hydrogenation rate of polybutadiene portion: 99.9%.

(b-5) A hydrogenated block copolymer having the A-B-A type structure of polystyrene (1)-hydrogenated polybutadiene-polystyrene (2) was synthesized according to the method above. A hydrogenated block copolymer (b-5) was obtained. The physical properties of (b-5) were as follows:

amount of bonded styrene: 29%, total amount of amount of 1,2-vinyl bond and amount of 3,4-vinyl bond in polybutadiene (total amount of vinyl bonds): 28%, the number average molecular weight of the hydrogenated block copolymer: 110000, the number average molecular weight of polystyrene (1): 15500, the number average molecular weight of polystyrene (2): 15500, and hydrogenation rate of polybutadiene portion: 99.9%.

Examples 3 to 7, and Comparative Examples 6 to 10

Using a twin screw extruder (made by Coperion GmbH, ZSK-25), a resin composition was produced as follows. In the screw extruder, a first raw material feeding port was provided upstream of the flow direction of the raw material, and a vacuum vent downstream thereof. The polyphenylene ether produced in (a) above and the hydrogenated block copolymer produced in (b) above were introduced into the extruder thus set in the composition shown in Table 1, and melt kneaded under the conditions of an extrusion temperature of 230 to 280° C., a number of rotation of the screw of 250 rpm, and an output rate of 12 kg/h. Thus, a resin composition was obtained as a pellet. The pellet was molded, and the molded product was used as a test piece. The physical properties of the obtained resin composition were measured as follows. The measurement results are shown in Table 1.

<Fluidity MFR>

According to JIS K7210, fluidity was measured at 230° C. and a load of 2.16 kg.

<Glass Transition Temperature Tg>

A tan δ value and the peak temperature of tan δ were measured as follows: a sample cut into a size measuring a width of 10 mm and a length of 35 mm; the sample was set in a twist type geometry in an apparatus "ARES" (trade name, made by TA Instruments-Waters LLC), and measured under the conditions of the effective measurement length of 25 mm, the strain of 0.5%, the frequency of 1 Hz, and the temperature raising rate of 3° C./rain. The tan δ peak temperature was determined from peaks detected by automatic detection of the peaks by an "RSI Orchestrator" (trade name, made by TA Instruments-Waters LLC). The measurement was performed according to ASTM D7028-07.

<Tensile Elongation at Break>

According to JIS K6301, a tensile elongation at break was measured at a test rate of 500 mm/min.

<Impact Resilience>

According to JIS K6255, an impact resilience was determined by a tripso-impact resilience test. Two layered samples were measured.

the shape of the sample: 10 mm×10 mm, thickness of 10

<Transparency>

A sample obtained by compression molding and having a thickness of 2 mm was disposed on a sheet of paper on which a letter was printed. Transparency was classified as below according to how the letter under the sample was seen:

○: the letter is clearly seen, and can be read,

Δ: the outline of the letter is unclear, and

X: the letter cannot be seen.

<Total Light Transmittance>

Using a sample obtained by compression molding and having a thickness of 2 mm, total light transmittance was measured according to JIS K7361.

TABLE 1

| | | | | Example 3 | Example 4 | Example 5 | Example 6 | Example 7 | Comparative Example 6 | Comparative Example 7 | Comparative Example 8 | Comparative Example 9 | Comparative Example 10 |
|---|---|---|---|---|---|---|---|---|---|---|---|---|---|
| PPE | | Amount of component having molecular weight of 50000 or more (% by mass) | Amount of component having molecular weight of 8000 or less (% by mass) | Number average molecular weight | | | | | | | | | |
| | a-1 | 12 | 22 | 11000 | 10 | 20 | 10 | 20 | 10 | | | | | |
| | a-2 | 6 | 12 | 11500 | | | | | | | | | | |
| | a-3 | 42 | 4 | 24600 | | | | | | 10 | 20 | | | |
| | a-4 | 8 | 8 | 12500 | | | | | | | | 10 | 20 | 10 |
| SEBS | | Number average molecular weight of hydrogenated block copolymer | Number average molecular weight of styrene block | Amount of vinyl bond (% by mass) | | | | | | | | | | |
| | b-1 | 65000 | 9800 | 36 | 90 | 80 | | | | | | | | |
| | b-2 | 49000 | 10300 | 36 | | | 90 | 80 | | | | | | |
| | b-3 | 60000 | 12000 | 35 | | | | | 90 | 90 | 80 | 90 | | |
| | b-4 | 97000 | 22000 | 75 | | | | | | | | | 80 | |
| | b-5 | 110000 | 15500 | 28 | | | | | | | | | | 90 |
| Physical properties | MFR | | | g/10 min | 3.1 | 4.3 | 2.5 | 4.3 | 3.4 | 3.0 | 3.9 | 1.9 | 4.0 | 0.7 |
| | Tg | | | °C. | 138 | 157 | 130 | 142 | 133 | 128 | 151 | 111 | 136 | 117 |
| | Tensile elongation | | | % | 530 | 410 | 505 | 510 | 520 | 510 | 380 | 419 | 500 | 460 |
| | Impact resilience | | | | 64 | 55 | 64 | 60 | 63 | 55 | 50 | 56 | 53 | 60 |
| | Transparency | | | | ○ | ○ | ○ | ○ | ○ | ○ | ○ | X | ○ | ○ |
| | Total light transmittance | | | % | 68 | 68 | 66 | 67 | 65 | 54 | 53 | 22 | 56 | 60 |

<Resin Composition Comprising Polyphenylene Ether, Hydrogenated Block Copolymer, and Other Component>

Other components used in Examples and Comparative Examples are shown below.

(PS-1): styrene homopolymer (made by PS Japan Corporation, PSJ Polystyrene 685)

(PP-1): homo-polypropylene, melting point=168° C., MFR=0.5

(F-1): talc having an average particle size of 11 microns (made by Hayashi-Kasei Co., Ltd.)

Examples 8 to 11 and Comparative Examples 11 and 12

Using a twin screw extruder (made by Coperion GmbH, ZSK-25), a resin composition was produced as follows. In the screw extruder, a first raw material feeding port was provided upstream of the flow direction of the raw material, and a vacuum vent downstream thereof. The polyphenylene ether produced in (a) above, the hydrogenated block copolymer produced in (b) above, and the other components above ((PS-1), (PP-1), and (F-1)) were introduced into the extruder thus set in the composition shown in Table 2, and melt kneaded under the conditions of a barrel temperature of 280 to 320° C., a number of rotation of the screw of 300 rpm, and an output rate of 12 kg/h. Thus, a resin composition was obtained as a pellet. The pellet was molded, and the molded product was used as a test piece. The physical properties of the obtained resin composition were measured as follows. The measurement results are shown in Table 2.

<MFR>

According to ISO1133, MFR was measured at 250° C. and a load of 10 kg.

<Tensile Test>

Using each of the pellets of the resin composition thus obtained in Examples and Comparative Examples, the pellet was fed to a screw in-line type injection molding machine whose temperature was set at 240 to 280° C., and injection molded under the condition of a metal mold temperature of 60° C. Thereby, a test piece for measurement of tensile strength was obtained. Using a geer oven, the test piece was left as it was under an environment at 80° C. for 24 hours, and subjected to a thermal history treatment.

Using the test piece after the thermal history treatment, tensile strength was measured. The measurement was performed according to ISO527.

<Flexural Modulus>

Using each of the pellets of the resin composition thus obtained in Examples and Comparative Examples, the pellet was fed to a screw in-line type injection molding machine whose temperature was set at 240 to 280° C., and injection molded under the condition of a metal mold temperature of 60° C. Thereby, a test piece for measurement of flexural modulus was obtained. Using a geer oven, the test piece was left as it was under an environment at 80° C. for 24 hours, and subjected to a thermal history treatment.

Using the test piece after the thermal history treatment, flexural modulus was measured. The measurement was performed according to ISO178.

TABLE 2

|  |  |  |  | Example 8 | Example 9 | Comparative Example 11 | Example 10 | Example 11 | Comparative Example 12 |
|---|---|---|---|---|---|---|---|---|---|
| First raw material feeding port | PPE | a-1 | % by mass | 34 | 43 | 43 | 27 | 34 | 34 |
|  | PS | PS-1 | mass | 9 |  |  | 7 |  |  |
|  | SEBS | b-4 |  | 6 | 6 |  | 4 | 4 |  |
|  |  | b-5 |  |  |  | 6 |  |  | 4 |
| Second raw material feeding port | PP | PP-1 | % by mass | 51 | 51 | 51 | 42 | 42 | 42 |
| Third raw material feeding port | Talc | F-1 | mass |  |  |  | 20 | 20 | 20 |
| Physical properties | MFR |  | g/10 min | 30 | 23 | 20 | 12 | 7 | 5.5 |
|  | Tensile strength |  | ° C. | 45 | 39 | 36 | 43 | 36 | 31 |
|  | Tensile elongation |  | % | 80 | 60 | 52 | 10 | 6 | 3.5 |
|  | Flexural modulus |  | % | 2080 | 1800 | 1620 | 3400 | 3020 | 2750 |

<Resin Composition Comprising Polyphenylene Ether, Hydrogenated Block Copolymer, and Other Component>

[Number Average Molecular Weight]

The number average molecular weights of the components, the amount of the component having a molecular weight of 8,000 or less, and the amount of the component having a molecular weight of 50,000 or more were measured by GPC (mobile phase: chloroform, standard substance: polystyrene).

[Weight Average Molecular Weight of Component (c)]

The weight average molecular weight of the component (c) was measured by GPC (mobile phase: o-dichlorobenzene, standard substance: polystyrene).

[Measurement of Amount of Bonded Styrene]

The amount of bonded styrene was measured by NMR.

[Measurement of Hydrogenation Rate]

The hydrogenation rate was measured by NMR.

[Measurement of Total Amount of Vinyl Bonds]

The total amount of the vinyl bonds was measured using an infrared spectrophotometer.

[Melting Point]

The melting point was measured using a differential scanning calorimeter.

[MFR]

MFR was measured according to ASTM D1238 at 230° C. and a load of 2.16 kg.

[Production of Components in Resin Composition]

Production of Polyphenylene Ether (a)

(a-5): polyphenylene ether (a-5) was obtained by the same production method as that in (a-1) described above.

the amount of the component having a molecular weight of 50,000 or more: 12% by mass the amount of the component having a molecular weight of 8,000 or less: 22% by mass the number average molecular weight: 11000

(a-6): polyphenylene ether (a-6) was obtained by the same production method as that in (a-2).

the amount of the component having a molecular weight of 50,000 or more: 6% by mass the amount of the component having a molecular weight of 8,000 or less: 12% by mass the number average molecular weight: 11500

(a-7): operation was performed in the same manner as in (a-6) except that the amount of xylene to be placed in the polymerization tank was 3167.7 g, the amount of n-butanol was 1583.8 g, and the amount of methanol was 1583.8 g. Thereby, approximately 6 kg of polyphenylene ether powder was obtained. Thus, polyphenylene ether powder (a-7) was obtained. As a result of GPC measurement, the molecular weight of (a-7) was as follows.

the amount of the component having a molecular weight of 50,000 or more: 24% by mass the amount of the component having a molecular weight of 8,000 or less: 5% by mass the number average molecular weight: 18200

(a-8): polyphenylene ether (a-8) was obtained by the same production method as that in (a-3).

the amount of the component having a molecular weight of 50,000 or more: 42% by mass the amount of the component having a molecular weight of 8,000 or less: 4% by mass the number average molecular weight: 24600

(a-9): polyphenylene ether (a-9) was obtained by the same production method as that in (a-4).

the amount of the component having a molecular weight of 50,000 or more: 8% by mass the amount of the component having a molecular weight of 8,000 or less: 8% by mass the number average molecular weight: 12500

Production of Hydrogenated Block Copolymer (b)

(b-6): a hydrogenated block copolymer having a structure of hydrogenated polybutadiene-polystyrene-hydrogenated polybutadiene-polystyrene (B-A-B-A) was synthesized, in which the amount of bonded styrene was 44%, the number average molecular weight of the entire polymer was 90,000, molecular weight distribution was 1.06, the number average molecular weight of the polystyrene portion (A) was 19,800, the total amount of the amount of the 1,2-vinyl bond and the amount of the 3,4-vinyl bond in polybutadiene before hydrogenation (total amount of the vinyl bonds) was 75%, and the hydrogenation rate of the polybutadiene portion was 99.9%. The polymer was (b-6).

(b-7): a hydrogenated block copolymer having a structure of polystyrene-hydrogenated polybutadiene-polystyrene (A-B-A) was synthesized, in which the amount of bonded styrene was 44%, the number average molecular weight of the entire polymer was 87,000, molecular weight distribution was 1.07, the number average molecular weight of the polystyrene portion (A) was 19,000, the total amount of the amount of the 1,2-vinyl bond and the amount of the 3,4-vinyl bond in polybutadiene before hydrogenation (total amount of the vinyl bonds) was 85%, and the hydrogenation rate of the polybutadiene portion was 99.9%. The polymer was (b-7).

(b-8): a hydrogenated block copolymer having a structure of polystyrene-hydrogenated polybutadiene-polystyrene-hydrogenated polybutadiene (A-B-A-B) was synthesized, in which the amount of bonded styrene was 32%, the number average molecular weight of the entire polymer was 52,000, molecular weight distribution was 1.07, the number average molecular weight of the polystyrene portion (A) was 8,300, the total amount of the amount of the 1,2-vinyl bond and the amount of the 3,4-vinyl bond in polybutadiene before hydrogenation (total amount of the vinyl bonds) was 74%, and the hydrogenation rate of the polybutadiene portion was 99.9%. The polymer was (b-8).

(b-9): a hydrogenated block copolymer having a structure of polystyrene-hydrogenated polybutadiene-polystyrene-hydrogenated polybutadiene (A-B-A-B) was synthesized, in which the amount of bonded styrene was 44%, the number average molecular weight of the entire polymer was 34,000, molecular weight distribution was 1.07, the number average molecular weight of the polystyrene portion (A) was 7,500, the total amount of the amount of the 1,2-vinyl bond and the amount of the 3,4-vinyl bond in polybutadiene before hydrogenation (total amount of the vinyl bonds) was 73%, and the hydrogenation rate of the polybutadiene portion was 99.9%. The polymer was (b-9).

(b-10): a hydrogenated block copolymer having a structure of polystyrene-hydrogenated polybutadiene-polystyrene-hydrogenated polybutadiene (A-B-A-B) was synthesized, in which the amount of bonded styrene was 44%, the number average molecular weight of the entire polymer was 120,000, molecular weight distribution was 1.07, the number average molecular weight of the polystyrene portion (A) was 26,400, the total amount of the amount of the 1,2-vinyl bond and the amount of the 3,4-vinyl bond in polybutadiene before hydrogenation (total amount of the vinyl bonds) was 75%, and the hydrogenation rate of the polybutadiene portion was 99.9%. The polymer was (b-10).

Highly Crystalline Polypropylene (c)

(c-1): homo-polypropylene, melting point=168° C., MFR=0.5 the amount of a component having a molecular weight of 1,000,000 or more=25% by mass (c-2): homo-polypropylene, melting point=166° C., MFR=2.5 the amount of a component having a molecular weight of 1,000,000 or more=16% by mass (c-3): homo-polypropylene, melting point=167° C., MFR=6.0 the amount of a component having a molecular weight of 1,000,000 or more=14% by mass (c-4): homo-polypropylene, melting point=160° C., MFR=13.2 the amount of a component having a molecular weight of 1,000,000 or more=7% by mass (c-5): homo-polypropylene, melting point=161° C., MFR= the amount of a component having a molecular weight of 1,000,000 or more=1.5% by mass Production of Hydrogenated Block Copolymer (d)

(d-1): a hydrogenated block copolymer having a structure of polystyrene-hydrogenated polybutadiene-polystyrene (A-B-A) was synthesized, in which the amount of bonded styrene was 60%, the number average molecular weight of the entire polymer was 108,000, molecular weight distribution was 1.08, the number average molecular weight of the polystyrene portion (A) was 32000, the total amount of the amount of the 1,2-vinyl bond and the amount of the 3,4-vinyl bond in polybutadiene before hydrogenation (total amount of the vinyl bonds) was 35%, and the hydrogenation rate of the polybutadiene portion was 99.9%. The polymer was (d-1).

(d-2): a hydrogenated block copolymer having a structure of polystyrene-hydrogenated polybutadiene-polystyrene (A-B-A) was synthesized, in which the amount of bonded styrene was 65%, the number average molecular weight of the entire polymer was 49,000, molecular weight distribution was 1.04, the number average molecular weight of the polystyrene portion (A) was 16000, the total amount of the amount of the 1,2-vinyl bond and the amount of the 3,4-vinyl bond in polybutadiene before hydrogenation (total amount of the vinyl bonds) was 38%, and the hydrogenation rate of the polybutadiene portion was 99.9%. The polymer was (d-2).

Production of Hydrogenated Block Copolymer (e)

(e-1): a hydrogenated block copolymer having a structure of polystyrene-hydrogenated polybutadiene-polystyrene-hydrogenated polystyrene (A-B-A-B) was synthesized, in which the amount of bonded styrene was 30%, the number average molecular weight of the entire polymer was 75,000, molecular weight distribution was 1.05, the number average molecular weight of the polystyrene portion (A) was 11000, the total amount of the amount of the 1,2-vinyl bond and the amount of the 3,4-vinyl bond in polybutadiene before hydrogenation (total amount of the vinyl bonds) was 33%, and the hydrogenation rate of the polybutadiene portion was 99.9%. The polymer was (e-1).

Filler as Component (f)

(f-1): talc having an average particle size of 7 microns (made by Hayashi-Kasei Co., Ltd., trade name "PK-P")

Examples 12 to 25 and Comparative Examples 13 to 24

Using a twin screw extruder (made by Coperion GmbH ZSK-25) having a first raw material feeding port and a second raw material feeding port (located in approximately the center of the extruder), the components (a) to (f) above (polypropylene, polyphenylene ether, hydrogenated block copolymer, and filler) in each of the compositions shown in Tables 3 to 5 were fed to the first raw material feeding port and the second raw material feeding port in the extruder, and melt kneaded. Thereby, a resin composition was obtained as a pellet. The screw extruder was set at a barrel temperature of 240 to 320° C. and a number of rotation of the screw of 300 rpm. The physical properties of the obtained resin composition were evaluated as follows. The measurement results are shown in Tables 3 to 5.

<MFR>

According to ISO1133, MFR was measured at 250° C. and a load of 10 kg.

<Tensile Test>

Using each of the pellets of the resin composition thus obtained in Examples and Comparative Examples, the pellet was fed to a screw in-line type injection molding machine whose temperature was set at 240 to 280° C., and injection molded under the condition of a metal mold temperature of 60° C. Thereby, a test piece for measurement of tensile strength was obtained. Using a geer oven, the obtained test piece was left as it was under an environment of 80° C. for 24 hours, and subjected to a thermal history treatment.

Using the test piece after the thermal history treatment, the tensile strength was measured according to ISO527.

<Flexural Modulus>

Using each of the pellets of the resin composition thus obtained in Examples and Comparative Examples, the pellet was fed to a screw in-line type injection molding machine whose temperature was set at 240 to 280° C., and injection molded under the condition of a metal mold temperature of 60° C. Thereby, a test piece for measurement of flexural modulus was obtained. Using a geer oven, the obtained test piece was left as it was under an environment of 80° C. for 24 hours, and subjected to a thermal history treatment.

Using the test piece after the thermal history treatment, the flexural modulus was measured according to ISO178.

<Retention Rate of Flexural Modulus>

The retention rate of flexural modulus was calculated using the following expression:

(flexural modulus retention rate)(%)=(flexural modulus under 100° C. environment)/(flexural modulus under 23° C. environment)×100

<Heat Resistance (Deflection Temperature Under Load)>

Using each of the pellets of the resin composition thus obtained in Examples and Comparative Examples, the pellet was fed to a screw in-line type injection molding machine whose temperature was set at 240 to 280° C., and injection molded under the condition of a metal mold temperature of 60° C. Thereby, a test piece for measurement of deflection temperature under load was obtained. Using a geer oven, the obtained test piece was left as it was under an environment of 80° C. for 24 hours, and subjected to a thermal history treatment.

Using the test piece after the thermal history treatment, the deflection temperature under load was measured according to ISO75-2 (load of 0.46 MPa).

<Charpy Impact Strength>

Using each of the pellets of the resin composition thus obtained in Examples and Comparative Examples, the pellet was fed to a screw in-line type injection molding machine whose temperature was set at 240 to 280° C., and molded under the condition of a metal mold temperature of 60° C. Thus, a test piece for measurement of Charpy impact strength was obtained. Using a geer oven, the obtained test piece was left as it was under an environment of 80° C. for 24 hours, and subjected to a thermal history treatment. Using the test piece after the thermal history treatment, the Charpy impact strength was measured according to ISO179.

<Thermal Stability of Dispersed Phase>

Using a pellet of the resin composition containing no filler, the thermal stability of the dispersed phase was measured as follows.

First, in a sample of the pellet of the resin composition containing no filler, the state of the dispersed phase was observed as an image using a transmission electron microscope (TEM). From the morphology of the image, the dispersion diameter of the polyphenylene ether in the sample was measured using an image processing apparatus. From the measurement result, the circle-equivalent average particle size (D1) in the pellet of the resin composition was calculated.

Next, the sample of the pellet of the resin composition containing no filler was compression molded (using a metal mold measuring a length of 54 mm×a width of 41 mm×a thickness of 2 mm, the sample was heat compression molded at a temperature of 260° C. and a pressure of 10 kg/cm² for 10 minutes, and immediately cooled using a cooling press at 10° C. for 5 minutes) to obtain a plate. Using a sample of the obtained compression molded plate, the circle-equivalent average particle size (D2) in the compression molded plate was calculated in the same manner as above.

The ratio of D2 to D1 obtained (D2/D1) was determined, and the thermal stability of the dispersed phase of the resin composition was evaluated.

TABLE 3

|  |  |  |  | Example 12 | Example 13 | Example 14 | Example 15 | Example 16 | Example 17 | Example 18 | Example 19 |
|---|---|---|---|---|---|---|---|---|---|---|---|
| First feeding port | PPE | Amount of component having molecular weight of 50000 or more (% by mass) | Amount of component having molecular weight of 8000 or less (% by mass) | Number average molecular weight | % by mass | | | | | | | |
| | a-5 | 12 | 22 | 11000 | 10 | | | | | | | |
| | a-6 | 6 | 12 | 11500 | | 36 | | | | | | |
| | a-7 | 24 | 5 | 18200 | | | 36 | | | | | |
| | a-8 | 42 | 4 | 24600 | | | | 36 | 36 | 36 | 36 | 55 |
| | a-9 | 8 | 8 | 12500 | | | | | | | | |
| | SEBS | Number average molecular weight of hydrogenated block copolymer | Amount of vinyl bond | | | | | | | | | |
| | b-6 | 90000 | 75 | | 2 | 9 | | 9 | 9 | | | |
| | b-7 | 87000 | 85 | | | | 9 | | | | | |
| | b-8 | 52000 | 74 | | | | | | | 9 | | |
| | b-9 | 34000 | 73 | | | | | | | | 5 | 5 |
| | b-10 | 120000 | 75 | | | | | | | | | |
| | PP | Melting point (° C.) | Amount of component having molecular weight of 1000000 or more (% by mass) | | | | | | | | | |
| | c-1 | 168 | 25 | | 29 | 9 | 9 | 9 | 9 | 9 | 9 | 9 |
| | c-3 | 167 | 14 | | | | | | | | | |
| | c-5 | 161 | 1.5 | | | | | | | | | |
| | SEBS | Number average molecular weight of hydrogenated block copolymer | Amount of vinyl bond | | | | | | | | | |
| | d-1 | 108000 | 35 | | | | | | | | | |
| | d-2 | 49000 | 38 | | | | | | | | | |
| | e-1 | 75000 | 33 | | | | | | | | | |
| | f-1 | | | Talc | | | | | | | | |
| Second feeding port | | | | | 59 | 45 | 45 | 45 | 45 | 45 | 45 | 27 |
| Performance | MFR (250° C., 10 Kg Load: g/10 min) | | | | >100 | 61 | 68 | 59 | 13 | 52 | 72 | 23 |
| | DTUL (0.46 MPa Load: ° C.) | | | | 123 | 134 | 131 | 140 | 139 | 139 | 140 | 160 |
| | Flexural modulus (MPa) | | | | 2250 | 2070 | 2010 | 2180 | 2170 | 2030 | 2220 | 2120 |
| | Flexural modulus Retention rate (%) | | | | 31 | 30 | 31 | 32 | 31 | 30 | 33 | 35 |
| | Tensile strength (MPa) | | | | 33 | 39 | 39 | 40 | 39 | 41 | 41 | 46 |
| | Charpy impact strength (KJ/m²) | | | | 5 | 10 | 12 | 10 | 12 | 10 | 10 | 12 |
| | Thermal stability of dispersed phase (D2/D1) | | | | 1.3 | 1.7 | 1.7 | 1.4 | 1.5 | 1.7 | 2.3 | 2.8 |

TABLE 4

| | | | | | Comparative Example 13 | Comparative Example 14 | Comparative Example 15 | Comparative Example 16 | Comparative Example 17 | Comparative Example 18 | Comparative Example 19 | Comparative Example 20 | Comparative Example 21 | Comparative Example 22 |
|---|---|---|---|---|---|---|---|---|---|---|---|---|---|---|
| First feeding port | PPE | | Amount of component having molecular weight of 50000 or more (% by mass) | Amount of component having molecular weight of 8000 or less (% by mass) | Number average molecular weight | % by mass | | | | | | | | | |
| | | a-5 | 12 | 22 | 11000 | 36 | | | | | | | | | 36 |
| | | a-6 | 6 | 12 | 11500 | | | | 36 | 36 | 36 | 36 | 36 | | |
| | | a-7 | 24 | 5 | 18200 | | | | | | | | | | |
| | | a-8 | 42 | 4 | 24600 | | 36 | | | | | | | 36 | |
| | | a-9 | 8 | 8 | 12500 | | | 36 | | | | | | | |
| | SEBS | | Number average molecular weight of hydrogenated block copolymer | Number average molecular weight of styrene block | Amount of vinyl bond | | | | | | | | | | |
| | | b-6 | 90000 | 19800 | 75 | 9 | 9 | 9 | | | | | | | |
| | | b-7 | 87000 | 19000 | 85 | | | | | | | | | | |
| | | b-8 | 52000 | 8300 | 74 | | | | | | | | | | |
| | | b-9 | 34000 | 7500 | 73 | | | | 9 | | | | | | 9 |
| | | b-10 | 120000 | 26400 | 75 | | | | | 9 | | | | | |
| | | | Amount of component having molecular weight of 1000000 or more (% by mass) | | | | | | | | | | | | |
| | | | 25 | | | | | | | | | | 5 | 5 | |
| | | | 14 | | | | | | | | | | | | |
| | | | 1.5 | | | | | | | | | | | | |
| | PP | | Melting point (° C.) | | | | | | | | | | | | |
| | | c-1 | 168 | | | 9 | 9 | 9 | 9 | 9 | | | 9 | 9 | 9 |
| | | c-3 | 167 | | | | | | | | 9 | | | | |
| | | c-5 | 161 | | | | | | | | | 9 | | | |
| Second feeding port | SEBS | | Number average molecular weight of hydrogenated block copolymer | Number average molecular weight of styrene block | Amount of vinyl bond | | | | | | | | | | |
| | | d-1 | 108000 | 32000 | 35 | 45 | 45 | 45 | 45 | 45 | 45 | 45 | | | |
| | | d-2 | 49000 | 16000 | 38 | | | | | | | | 45 | 5 | |
| | | e-1 | 75000 | 11000 | 33 | | | | | | | | | 45 | |
| | | f-1 | Talc | | | | | | | | | | | | 45 |

TABLE 4-continued

|  |  | Com-parative Example 13 | Com-parative Example 14 | Com-parative Example 15 | Com-parative Example 16 | Com-parative Example 17 | Com-parative Example 18 | Com-parative Example 19 | Com-parative Example 20 | Com-parative Example 21 | Com-parative Example 22 |
|---|---|---|---|---|---|---|---|---|---|---|---|
| Performance | MFR (250° C., 10 Kg Load: g/10 min) | 48 | 36 | 50 | 71 | 36 | 49 | 53 | 43 | 35 | 70 |
|  | DTUL (0.46 MPa Load: ° C.) | 127 | 125 | 130 | 120 | 115 | 123 | 136 | 128 | 126 | 125 |
|  | Flexural modulus (MPa) | 1900 | 1880 | 1930 | 1780 | 1750 | 1820 | 2110 | 2040 | 2090 | 1750 |
|  | Flexural modulus Retention rate (%) | 25 | 24 | 26 | 29 | 29 | 29 | 31 | 23 | 24 | 25 |
|  | Tensile strength (MPa) | 37 | 38 | 38 | 34 | 36 | 33 | 40 | 36 | 37 | 37 |
|  | Charpy impact strength (KJ/m²) | 7 | 9 | 8 | 12 | 14 | 10 | 8 | 6 | 6 | 12.0 |
|  | Thermal stability of dispersed phase (D2/D1) | 1.6 | 1.7 | 1.6 | 4.0 | 2.2 | 5.5 | 5.5 | 2.7 | 2.9 | 2.5 |

TABLE 5

|  |  |  |  | Example 20 | Example 21 | Example 22 | Comparative Example 23 | Example 23 | Comparative Example 24 | Example 24 | Example 25 |
|---|---|---|---|---|---|---|---|---|---|---|---|
| First feeding port | PPE | a-5 | Amount of component having molecular weight of 50000 or more (% by mass) | 12 | | | | | | | |
| | | a-6 | | 6 | 41 | 36 | | 64 | 64 | 19 | 44 |
| | | a-7 | | 24 | | | 41 | | | | |
| | | | Amount of component having molecular weight of 8000 or less (% by mass) | 22 | | | | | | | |
| | | | | 12 | | | | | | | |
| | | | | 5 | | | | | | | |
| | | | Number average molecular weight | 11000 | | | | | | | |
| | | | | 11500 | | | | | | | |
| | | | | 18200 | | | | | | | |
| | SEBS | b-6 | Number average molecular weight of hydrogenated block copolymer | 90000 | | | | | | | |
| | | b-7 | | 87000 | | | | | | | |
| | | b-8 | | 52000 | | | | | | | |
| | | | Number average molecular weight of styrene block | 19800 | | | | | | | |
| | | | | 19000 | | | | | | | |
| | | | | 8300 | | | | | | | |
| | | | Amount of vinyl bond | 75 | | | | | | | |
| | | | | 85 | | | | | | | |
| | | | | 74 | | | | | | | |
| | | | | 2 | 8 | | 8 | 9 | 9 | 5 | 11 |
| | | | | | | 7 | | | | | |
| | PP | c-2 | Melting point (° C.) | 166 | | | | | | | |
| | | c-3 | | 167 | | | | | | | |
| | | c-4 | | 160 | | | | | | | |
| | | | Amount of component having molecular weight of 1000000 or more (% by mass) | 16 | | | | | | | |
| | | | | 14 | | | | | | | |
| | | | | 7 | | | | | | | |
| | | | | 79 | 41 | 36 | 41 | 9 | 9 | 19 | 9 |
| | SEBS | | Number average molecular weight of hydrogenated block copolymer | 32000 | | | | | | | |
| | | | | 11000 | | | | | | | |
| | | | Number average molecular weight of styrene block | | | | | | | | |
| | | | Amount of vinyl bond | 35 | | | | | | | |
| | | | | 33 | | | | | | | |
| Second feeding port | | d-1 | | 10 | 10 | | 10 | | | | |
| | | e-1 | | | | 20 | | 18 | 18 | | |
| | | c-2 | | | | | | 9 | 9 | 9 | 2 |
| | | c-4 | | | | | | | | | |
| | | f-1 | Talc | | | | | | | 56 | 35 |
| Composition Performance | | | MFR (250° C., 10 Kg Load: g/10 min) | >100 | 54 | 45 | 35 | 7.9 | 5.5 | >100 | 70 |
| | | | DTUL (0.46 MPa Load: ° C.) | 125 | 138 | 138 | 125 | 170 | 178 | 107 | 129 |
| | | | Flexural modulus (MPa) | 2620 | 2510 | 3010 | 2280 | 2050 | 2150 | 1800 | 1890 |
| | | | Flexural modulus Retention rate (%) | 34 | 36 | 37 | 30 | 33 | 32 | 31 | 33 |
| | | | Tensile strength (MPa) | 33 | 39 | 39 | 34 | 50 | 52 | 33 | 35 |
| | | | Charpy impact strength (KJ/m²) | 3.0 | 5.1 | 6.0 | 4.5 | 13.5 | 8.5 | 5.1 | 6.0 |
| | | | Thermal stability of dispersed phase (D2/D1) | — | — | — | — | 3.3 | 7 | 2 | 2.8 |

<Pellet of Resin Composition Comprising Polyphenylene Ether, Hydrogenated Block Copolymer, and Polypropylene>
[Number Average Molecular Weight]

The number average molecular weights of the components, the amount of the component having a molecular weight of 8,000 or less, and the amount of the component having a molecular weight of 50,000 or more were measured by GPC (mobile phase: chloroform, standard substance: polystyrene).

[Weight Average Molecular Weight of Component (c)]

The weight average molecular weight of the component (c) was measured by GPC (mobile phase: o-dichlorobenzene, standard substance: polystyrene).

[Measurement of Amount of Bonded Styrene]

The amount of bonded styrene was measured by NMR.

[Measurement of Hydrogenation Rate]

The hydrogenation rate was measured by NMR.

[Measurement of Total Amount of Vinyl Bonds]

The total amount of the vinyl bonds was measured using an infrared spectrophotometer.

[Melting Point]

The melting point was measured using a differential scanning calorimeter.

[MFR]

MFR was measured according to ASTM D1238 at 230° C. and a load of 2.16 kg.

[Components in Resin Composition]

Polyphenylene Ether (a)
(a-10): the same was used as in (a-1).
the amount of the component having a molecular weight of 50,000 or more: 12% by mass
the amount of the component having a molecular weight of 8,000 or less: 22% by mass
the number average molecular weight: 11000
(a-11): the same was used as in (a-2).
the amount of the component having a molecular weight of 50,000 or more: 6% by mass
the amount of the component having a molecular weight of 8,000 or less: 12% by mass
the number average molecular weight: 11500
(a-12): the same was used as in (a-7).
the amount of the component having a molecular weight of 50,000 or more: 24% by mass
the amount of the component having a molecular weight of 8,000 or less: 5% by mass
the number average molecular weight: 18200

Hydrogenated Block Copolymer (b)
(b-11): a hydrogenated block copolymer having a structure of hydrogenated polybutadiene-polystyrene-hydrogenated polybutadiene-polystyrene (B-A-B-A) was synthesized, in which the amount of bonded styrene was 42%, the number average molecular weight of the entire polymer was 88,000, molecular weight distribution was 1.06, the number average molecular weight of the polystyrene portion (A) was 19000, the total amount of the amount of the 1,2-vinyl bond and the amount of the 3,4-vinyl bond in polybutadiene before hydrogenation (total amount of the vinyl bonds) was 76%, and the hydrogenation rate of the polybutadiene portion was 99.9%. The polymer was (b-11).

(b-12): a hydrogenated block copolymer having a structure of polystyrene-hydrogenated polybutadiene-polystyrene-hydrogenated polybutadiene (A-B-A-B) was synthesized, in which the amount of bonded styrene was 35%, the number average molecular weight of the entire polymer was 50,000, molecular weight distribution was 1.07, the number average molecular weight of the polystyrene portion (A) was 8800, the total amount of the amount of the 1,2-vinyl bond and the amount of the 3,4-vinyl bond in polybutadiene before hydrogenation (total amount of the vinyl bonds) was 74%, and the hydrogenation rate of the polybutadiene portion was 99.9%. The polymer was (b-12).

(b-13): a hydrogenated block copolymer having a structure of polystyrene-hydrogenated polybutadiene-polystyrene-hydrogenated polybutadiene (A-B-A-B) was synthesized, in which the amount of bonded styrene was 43%, the number average molecular weight of the entire polymer was 86,000, molecular weight distribution was 1.07, the number average molecular weight of the polystyrene portion (A) was 19000, the total amount of the amount of the 1,2-vinyl bond and the amount of the 3,4-vinyl bond in polybutadiene before hydrogenation (total amount of the vinyl bonds) was 36%, and the hydrogenation rate of the polybutadiene portion was 99.9%. The polymer was (b-13).

Highly Crystalline Polypropylene (c)
(c-6): homo-polypropylene, melting point=168° C., MFR=0.5
the amount of a component having a molecular weight of 1,000,000 or more=25% by mass
(c-7): homo-polypropylene, melting point=167° C., MFR=2.5
the amount of a component having a molecular weight of 1,000,000 or more=16% by mass
(c-8): homo-polypropylene, melting point=165° C., MFR=12.2
the amount of a component having a molecular weight of 1,000,000 or more=6% by mass
(c-9): homo-polypropylene, melting point=164° C., MFR=0.4
the amount of a component having a molecular weight of 1,000,000 or more=26% by mass Examples 26 to 35 and Comparative Examples 25 to 27

Using a twin screw extruder (made by Coperion GmbH ZSK-25) having a first raw material feeding port and a second raw material feeding port (located in approximately the center of the extruder), the components (a) to (c) above (polypropylene, polyphenylene ether, and hydrogenated block copolymer) in the composition shown in Table 6 were fed to the first raw material feeding port and the second raw material feeding port in the extruder, and melt kneaded. Thus, a pellet of the resin composition was obtained. The screw extruder was set at a barrel temperature of 270 to 320° C. and a number of rotation of the screw of 300 rpm. The physical properties of the obtained resin composition were evaluated as follows. The measurement results are shown in Table 6.

<Suppression in Die Drool>

The pellet obtained above and the polypropylene (c-7) above were fed to a twin screw extruder having a first raw material feeding port (PCM-30; made by Ikegai Corp., Japan), and melt kneaded to obtain a pellet. The screw extruder was set at temperatures of 150/250/250/250/250/250/250° C. and a number of rotation of the screw of 150 rpm. The vent was open, and the total amount of the pellet was fed to the first raw material feeding port. The amount of the polypropylene (c-7) fed was adjusted such that the amount of the component (a) was finally 30% by mass wherein the total amount of the components (a), (b), and (c) in the resin composition was 100% by mass. The amount of (c-7) fed adjusted is shown in Table 6.

In production of the pellet, the pellet was continuously extruded for 30 minutes, and the amount of die drool occurring in the die was observed. Suppression in die drool was determined according to the determination criterion below, and the results are shown in Table 6.

(Determination Criterion on Suppression in Die Drool)

◯: no die drool occurred for 30 minutes.

X: occurrence of die drool was even slightly found during 30 minutes.

In Example 33, operation was performed in the same manner as in Example 29 except that a high impact polystyrene (made by PS Japan Corporation, H9405) was used instead of the component (c-7) fed.

<Lightfastness>

The obtained pellet was fed to a screw in-line type injection molding machine whose temperature was set at 240 to 280° C., and injection molded under the condition of a metal mold temperature of 60° C. Thereby, a test piece for a tensile test (outer shape: total length×total width=150 mm×20 mm, test portion: thickness×width×length=4 mm×10 mm×80 mm) was obtained. Using the test piece, an accelerated lightfastness test for 400 hours was performed using a Xenon Weather-Ometer made by Atlas Material Testing Technology LLC under the following conditions. The test method according to ASTM D4459 was used.

temperature of a black panel: 55° C., temperature of a test tank: 45° C., relative humidity: 55%, irradiance (under 340 nm): 0.30 W/m², glass filter: inner Borosilicate/outer Soda Lim Before and after the accelerated lightfastness test, the test piece was subjected to a tensile strength test according to ISO527.

The retention rate of the tensile strength was calculated using the following expression. According to the determination criterion below, lightfastness was determined.

(tensile strength retention rate)(%)=(tensile strength after 400 hour accelerated lightfastness test)/ (tensile strength before accelerated lightfastness test)×100

◯: the tensile strength retention rate is 90% or more

Δ: the tensile strength retention rate is 80% or more and less than 90%

X: the tensile strength retention rate is less than 80%

<State of Peel Off of Layers>

A narrow portion of the test piece for a tensile test produced in <Lightfastness> above was cut with a pair of pruning scissors, and the cut surface thereof was visually observed. The state of peel off of layers was determined according to the determination criterion below (n=5).

(Determination Criterion for State of Peel Off of Layers)

◯: no peel off of layers was found in 5 test pieces.

Δ: peel off of layers was found in one of the 5 test pieces.

X: peel off of layers was found in two or more of the 5 test pieces.

TABLE 6

| | | | | | Example 26 | Example 27 | Example 28 | Example 29 | Example 30 | Example 31 | Example 32 | Example 33 | Example 34 | Example 35 | Comparative Example 25 | Comparative Example 26 | Comparative Example 27 |
|---|---|---|---|---|---|---|---|---|---|---|---|---|---|---|---|---|---|
| First extrusion composition | PPE | a-10 | Amount of component having molecular weight of 50000 or more (% by mass) | 12 | 64 | 73 | 41 | 83 | 64 | | 64 | 83 | 41 | 64 | 70 | | |
| | | a-11 | | 6 | | | | | | 55 | | | | | | 64 | |
| | | a-12 | | 24 | | | | | | | | | | | | | 73 |
| | | a-10 | Amount of component having molecular weight of 8000 or less (% by mass) | 22 | | | | | | | | | | | | | |
| | | a-11 | | 12 | | | | | | | | | | | | | |
| | | a-12 | | 5 | | | | | | | | | | | | | |
| | | a-10 | Number average molecular weight | 11000 | | | | | | | | | | | | | |
| | | a-11 | | 11500 | | | | | | | | | | | | | |
| | | a-12 | | 18200 | | | | | | | | | | | | | |
| | SEBS | b-11 | Number average molecular weight of hydrogenated block copolymer | 88000 | 9 | 9 | 9 | 17 | 9 | 9 | 9 | 17 | 9 | 5 | 10 | | 9 |
| | | b-12 | | 50000 | | | | | | | | | | 5 | | 9 | |
| | | b-13 | | 86000 | | | | | | | | | | | | | |
| | | b-11 | Number average molecular weight of styrene block | 19000 | | | | | | | | | | | | | |
| | | b-12 | | 8800 | | | | | | | | | | | | | |
| | | b-13 | | 19000 | | | | | | | | | | | | | |
| | | b-11 | Amount of vinyl bond | 76 | | | | | | | | | | | | | |
| | | b-12 | | 74 | | | | | | | | | | | | | |
| | | b-13 | | 36 | | | | | | | | | | | | | |
| | | b-11 | Amount of component having molecular weight of 1000000 or more (% by mass) | 25 | | | | | | | | | | | | | |
| | | b-12 | | 16 | | | | | | | | | | | | | |
| | | b-13 | | 6 | | | | | | | | | | | | | |
| | PP | c-6 | Melting point (°C.) | 168 | 9 | 9 | 9 | | 5 | 9 | 9 | | | | | | |
| | | c-7 | | 167 | | | | | 5 | | | | | 9 | | 9 | 9 |
| | | c-8 | | 165 | | | | | 9 | | | | 9 | | | | |
| | | c-9 | | 164 | | | | | 9 | | | | | | | | |
| First feeding port | | | | | | | | | | | | | | | | | |
| Second feeding port | | c-6 | | 26 | 18 | | 41 | | | 27 | 18 | 17 | | 18 | 20 | 18 | |
| | | c-7 | | 25 | | | | | | | | | | | | | |
| | | c-8 | | 16 | | | | | | | | | | | | | |
| | | c-9 | | 26 | | | | | | | | 41 | | | | | |
| Second extrusion | Amount of PP (c-7) to be fed (parts by mass/100 parts by mass of pellet) | | | | 112 | 142 | 36 | 178 | 112 | 82 | 112 | (178)* | 36 | 112 | 133.3 | 112 | 142 |
| Performance | Lightfastness | | | | ○ | ○ | ○ | ○ | ○ | △ | ○ | X | ○ | ○ | X | X | ○ |
| | Suppression in die drool | | | | ○ | ○ | ○ | ○ | ○ | ○ | X | ○ | △ | ○ | X | X | X |
| | Presence or absence of peel off of layers | | | | ○ | ○ | ○ | ○ | ○ | ○ | X | ○ | ○ | ○ | X | ○ | ○ |

*A high impact polystyrene was fed instead of PP (c-7).

From above, it turned out that use of the hydrogenated block copolymer having the specific structure as the compatibilizer in the pellet comprising polyphenylene ether was important from the viewpoint of improvement in performance of the final composition. Further, it turned out that if the polyphenylene ether having the specific structure was selected, the lightfastness and peel off of layers in the obtained composition, and suppression in die drool during processing was able to be significantly improved.

Example 36

The pellet obtained in Example 26, polypropylene (c-7), and the talc (f-1) as the component (f) filler were fed to a twin screw extruder having a first raw material feeding port (PCM-30; made by Ikegai Corp., Japan), and melt kneaded to obtain a pellet. The screw extruder was set at temperatures of 150/250/250/250/250/250/250° C. and a number of rotation of the screw of 150 rpm. The vent was open, and the total amount of the pellet was fed to the first raw material feeding port. The amount of the polypropylene (c-7) fed was adjusted such that the amount of the component (f) was 15% by mass and the amount of the component (a) was 30% by mass based on 100% by mass of the total amount of the components (a) to (c), and (f).

The obtained pellet was evaluated in the same manner as above. The results were lightfastness: ○, suppression in die drool: ○, and the state of peel off of layers: ○.

The pellet obtained above was fed to a screw in-line type injection molding machine whose temperature was set at 240 to 280° C., and injection molded into a test piece for a tensile test (outer shape: total length×total width=150 mm×20 mm, test portion: thickness×width×length=4 mm×10 mm×80 mm) under the condition of a metal mold temperature of 60° C.

Example 37

Using the pellet obtained in Example 28, the component (c-7) was dry blended such that the amount of the component (a) was finally 30% by mass. Thus, a mixture was obtained. The mixture was fed to a screw in-line type injection molding machine whose temperature was set at 240 to 280° C., and injection molded under the condition of a metal mold temperature of 60° C. Thereby, a test piece for a tensile test (outer shape: total length×total width=150 mm×20 mm, test portion: thickness×width×length=4 mm×10 mm×80 mm) was obtained. Using the test piece for a tensile test, the lightfastness and the state of peel off of layers were evaluated in the same manner as above. The results were lightfastness: ○, and the state of peel off of layers: ○.

Example 38

Using the pellet obtained in Example 28, the component (c-7) was dry blended such that the amount of the component (a) was finally 30% by mass. Thus, a mixture was obtained. The mixture was fed to a single screw extruder with a vent having a screw diameter of 65 mm in which a cylinder temperature was set at 260° C. and a T die temperature was set at 260° C. The mixture was extrusion film molded to obtain a film. The winding rate was controlled such that the output rate was 60 kg/hr, the thickness of the T die slit was 0.15 mm, the width of the die slit was 650 mm, the surface temperature of a rolling roller was 80° C., and the thickness was 50 μm.

During the extrusion film molding, no production of die drool was found at the interface between the T die and the molten resin for 30 minutes. No peel off of layers was found in the cut surface of the film, and a film having a good appearance was obtained.

Industrial Applicability

The resin composition and molded articles according to the present invention have industrial applicability as automobile parts, heat-resistant parts, parts for electronic apparatuses, industrial parts, and coating materials.

The invention claimed is:

1. A resin composition comprising:
a polyphenylene ether (a) comprising 5 to 20% by mass of a component having a molecular weight of 50,000 or more and 12 to 30% by mass of a component having a molecular weight of 8,000 or less, the molecular weights being measured by gel permeation chromatography;
a hydrogenated block copolymer (b) prepared by hydrogenating a block copolymer comprising at least two polymer blocks A mainly containing a vinyl aromatic compound and at least one polymer block B mainly containing a conjugated diene compound, wherein a number average molecular weight (Mnb) of the hydrogenated block copolymer is 100,000 or less, and a number average molecular weight (MnbA) of at least one polymer block of the polymer blocks A is 8,000 or more; and
a polypropylene (c),
wherein an amount of the polyphenylene ether (a) is 1 to 99% by mass and an amount of the hydrogenated block copolymer (b) is 99 to 1% by mass where a total amount of the polyphenylene ether (a) and the hydrogenated block copolymer (b) is 100% by mass, and
an amount of the polypropylene (c) is 1 to 95% by mass where a total amount of the components (a) to (c) is 100% by mass,
wherein in a bonding form of the conjugated diene compound in the polymer block B in the hydrogenated block copolymer (b), a total amount of the conjugated diene compound bonded with a 1,2-vinyl bond or a 3,4-vinyl bond is 70 to 90% by mass based on all the conjugated diene compounds that form the polymer block B, and
wherein a content of the polymer blocks A in the hydrogenated block copolymer (b) is 15 to 50% by mass based on the entire hydrogenated block copolymer (b).

2. The resin composition according to claim 1, wherein the polypropylene (c) is a mixture of at least two polypropylenes having different molecular weights, and comprises a homopolypropylene and/or a block polypropylene, and
a melt flow rate (MFR: measured according to ASTM D1238 at 230° C. and a load of 2.16 kg) of the homopolypropylene and/or the block polypropylene is 0.1 to 100 g/10 min.

3. The resin composition according to claim 1, further comprising an organic stabilizer,
wherein a content of the organic stabilizer is 0.1 to 2.0% by mass where a total amount of the resin composition is 100% by mass,
the organic stabilizer contains at least a hindered phenol-based stabilizer, and
a content of the hindered phenol-based stabilizer in the organic stabilizer is 40 to 100% by mass where a total amount of the organic stabilizer is 100% by mass.

4. The resin composition according to claim 1, further comprising a filler (f),
wherein a content of the filler (f) is 2 to 60% by mass based on a total amount of the resin composition.

* * * * *